(12) United States Patent
Kim et al.

(10) Patent No.: US 11,296,559 B2
(45) Date of Patent: Apr. 5, 2022

(54) APPARATUS AND METHOD FOR PERFORMING FOREIGN OBJECT DETECTION IN WIRELESS POWER TRANSFER SYSTEM

(71) Applicant: LG ELECTRONICS INC., Seoul (KR)

(72) Inventors: Kyunghwan Kim, Seoul (KR); Yongcheol Park, Seoul (KR); Jihyun Lee, Seoul (KR); Gyunghwan Yook, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/217,170

(22) Filed: Mar. 30, 2021

(65) Prior Publication Data

US 2021/0218287 A1 Jul. 15, 2021

Related U.S. Application Data

(63) Continuation of application No. 16/915,836, filed on Jun. 29, 2020, now Pat. No. 10,971,955, which is a (Continued)

(30) Foreign Application Priority Data

Apr. 18, 2018 (KR) .................. 10-2018-0045256

(51) Int. Cl.
*H02J 50/60* (2016.01)
*H02J 50/80* (2016.01)
(Continued)

(52) U.S. Cl.
CPC .............. *H02J 50/60* (2016.02); *H02J 50/12* (2016.02); *H02J 50/80* (2016.02); *H04B 5/0037* (2013.01)

(58) Field of Classification Search
CPC ............. H02J 50/60; H02J 50/80; H02J 50/12
(Continued)

(56) References Cited

U.S. PATENT DOCUMENTS 10,971,955 B2 * 4/2021 Kim ..................... H04B 5/0037
2015/0357861 A1 12/2015 Muurinen et al.
(Continued)

FOREIGN PATENT DOCUMENTS

KR 1020120026789 3/2012
KR 1020180010796 1/2018
(Continued)

OTHER PUBLICATIONS

PCT International Application No. PCT/KR2014/005057, International Search Report dated Feb. 28, 2014, 2 pages.
(Continued)

*Primary Examiner* — Tomi Skibinski
(74) *Attorney, Agent, or Firm* — Lee Hong Degerman Kang Waimey

(57) ABSTRACT

Provided are an apparatus and method for performing foreign object detection in a wireless power transfer system. The present specification discloses a method comprising receiving a digital ping from the wireless power transmitter; transmitting an identification and configuration packets to the wireless power transmitter; transmitting a foreign object detection (FOD) state packet which indicates a reference Q factor of the wireless power receiver to the wireless power transmitter; and receiving wireless power through magnetic coupling from the wireless power transmitter based on the foreign object detection result of the wireless power transmitter using the reference Q factor. Irrespective of individual characteristics of a wireless power receiver, accuracy and reliability of detecting a foreign object may be improved.

14 Claims, 24 Drawing Sheets

Related U.S. Application Data continuation of application No. 16/375,823, filed on Apr. 4, 2019, now Pat. No. 11,050,300.

(51) Int. Cl.
*H04B 5/00* (2006.01)
*H02J 50/12* (2016.01)

(58) Field of Classification Search
USPC .......................................................... 307/104
See application file for complete search history.

(56) References Cited

U.S. PATENT DOCUMENTS

| | | |
|---|---|---|
| 2016/0164302 A1 | 6/2016 | Nakano et al. |
| 2016/0352155 A1 | 12/2016 | Iwasaki |
| 2019/0326786 A1 | 10/2019 | Kim et al. |
| 2020/0328629 A1 | 10/2020 | Kim et al. |

FOREIGN PATENT DOCUMENTS

| | | |
|---|---|---|
| KR | 1020180022513 | 3/2018 |
| WO | 2016057674 | 4/2016 |

OTHER PUBLICATIONS

United States Patent and Trademark Office U.S. Appl. No. 16/915,836, Office Action dated Aug. 24, 2020, 17 pages.

\* cited by examiner

FIG. 10

| Preamble | ZERO | Response | Type | Info | Parity |
|---|---|---|---|---|---|

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved FIG. 13
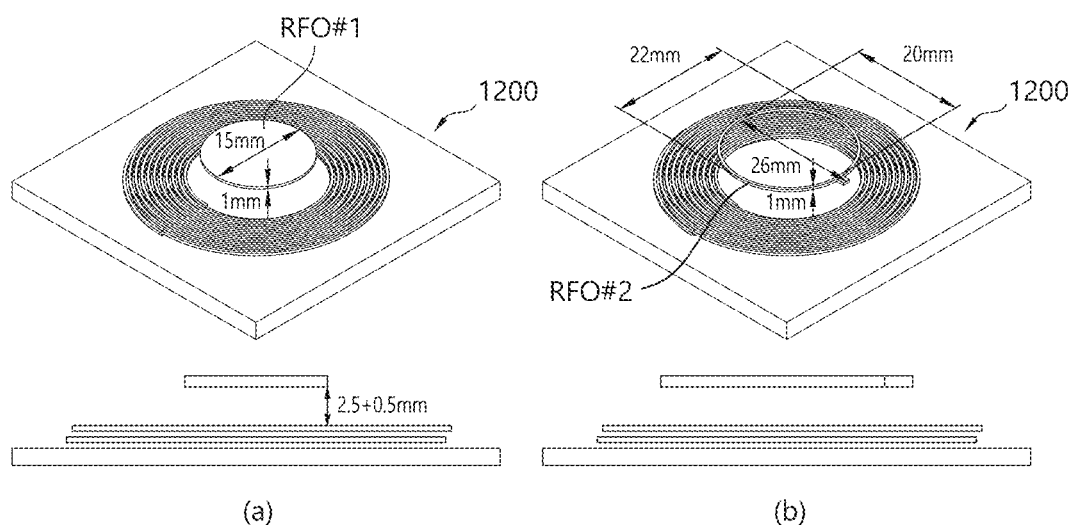
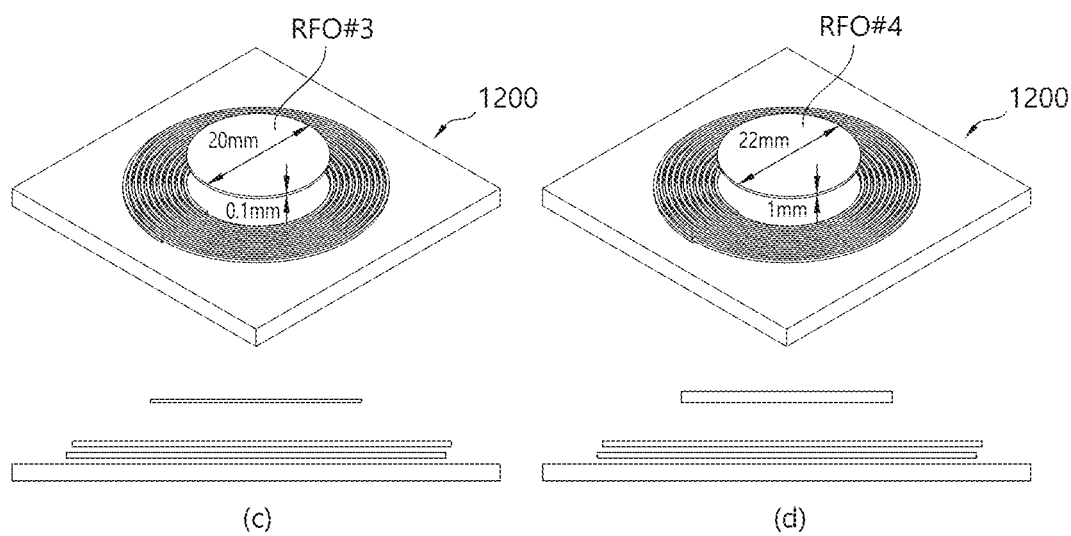

FIG. 16
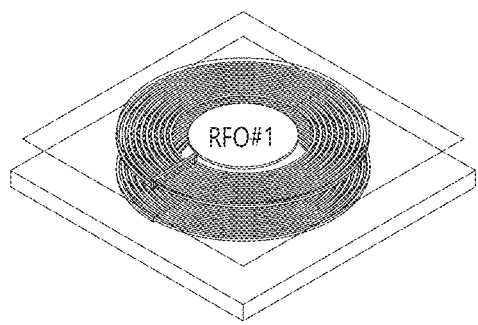
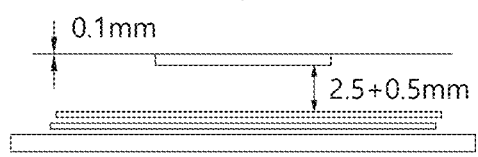
(a)
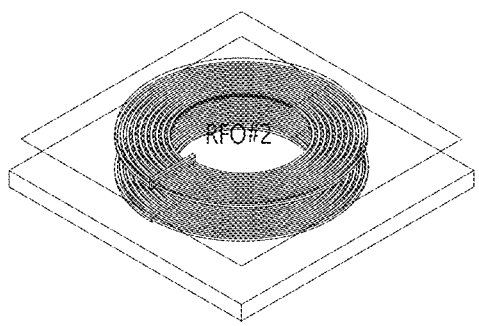
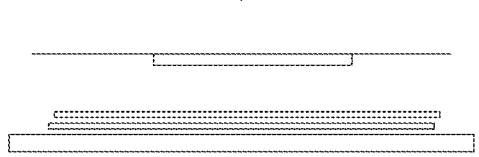
(b)
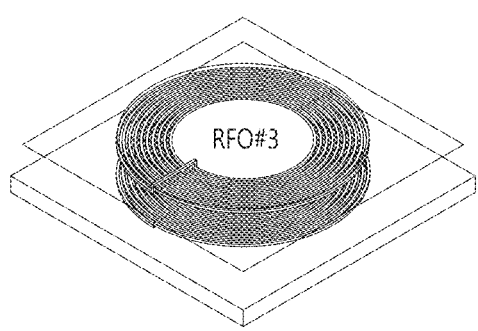
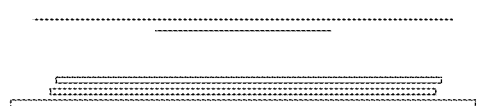
(c)
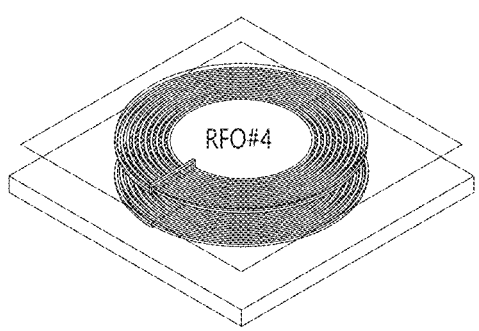
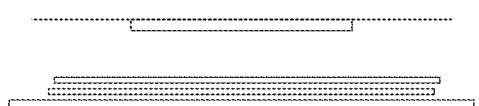
(d)

FIG. 21

|  | $b_7$ | $b_6$ | $b_5$ | $b_4$ | $b_3$ | $b_2$ | $b_1$ | $b_0$ |
|---|---|---|---|---|---|---|---|---|
| $B_1$ | $Q_{ref.} \leq Q'_{ref.}$ | | Reserved | | | | Mode | |
| $B_2$ | Reference Quality Factor Value | | | | | | | |

APPARATUS AND METHOD FOR PERFORMING FOREIGN OBJECT DETECTION IN WIRELESS POWER TRANSFER SYSTEM

CROSS-REFERENCE TO RELATED APPLICATIONS

This application is a continuation of U.S. patent application Ser. No. 16/915,836 filed on Jun. 29, 2020, which is a continuation of U.S. patent application Ser. No. 16/375,823 filed on Apr. 4, 2019, which claims the benefit of earlier filing date and right of priority to Korean Patent Application No. 10-2018-0045256, filed on Apr. 18, 2018, the contents of which are all hereby incorporated by reference herein in their entirety.

BACKGROUND OF THE INVENTION

Field of the Invention

The present invention relates to a wireless power transfer system and, more particularly, to an apparatus and method for performing foreign object detection in a wireless power transfer system.

Related Art

Wireless power transfer is a technology for transferring electrical power wirelessly between a power source and an electronic device. In one example, wireless power transfer technology allows the battery of a wireless terminal such as a smartphone or table to be charged simply by putting the terminal on a wireless charging pad, thereby providing excellent mobility, convenience, and safety compared with the existing charging environment using wired charging connectors. Wireless power transfer technology is getting attention as a means to replace the existing wired power transfer environment in various fields such as consumer electronics, industrial machines, military devices, automobiles, infrastructure, and medical devices.

The Wireless Power Consortium (WPC), which is leading standardization of the wireless power transfer technology, has classified electronic devices into a few groups according to the amount of transmitted and received power and is developing standards for the respective groups. For example, a first group is developing a small power standard (less than about 5 W or about 30 W) aimed for wearable devices including a smart watch, smart glass, Head Mounted Display (HMD), and smart ring; and mobile electronic devices (or portable electronic devices) such as an earphone, remote controller, smartphone, PDA, and tablet PC. A second group is developing a mid-power standard (less than about 60 W or about 200 W) aimed for mid-sized/small-sized home appliances such as notebooks, robot cleaners, TVs, sound devices, vacuum cleaners, and monitors. A third group is developing a large power standard (less than about 2 kW or 22 kW) aimed for kitchen appliances such as a blender, microwave oven, and electric rice cooker; and personal mobility devices (or electronic devices/mobility means) such as a wheelchair, electric kickboard, electric bicycle, and electric car.

In the terminal supply system, as long as a charger and a device are connected properly, there is little possibility that an impeding factor such as a foreign object interfering with charging of the device lies between them. On the other hand, due to the nature of contactless charging, a wireless power transfer system may allow an unnecessary foreign object to lie between a wireless power receiver and a wireless power transmitter during charging. When a foreign object such as metal exists between a wireless power transmitter and a wireless power receiver, not only power transfer is not carried out smoothly due to the foreign object but also a problem such as overload or fire damage and explosion of a product due to the foreign object may occur. To solve the problem, various methods for detecting a foreign object have been introduced, but the foreign object may not be detected properly because of differences in the characteristics of individual wireless power receivers. Therefore, an apparatus and method for improving accuracy and reliability of detecting a foreign object irrespective of individual characteristics of a wireless power receiver are required.

SUMMARY OF THE INVENTION

An object of the present invention is to provide an apparatus and method for improving reliability and accuracy of detecting a foreign object in a wireless power transfer system.

Another object of the present invention is to provide an optimal Q factor which guarantees reliable detection of a foreign object in a wireless power transfer system.

Yet another object of the present invention is to provide an apparatus and method for performing detection of a foreign object based on the optimal Q factor in a wireless power transfer system.

According to one aspect of the present invention, a method for receiving wireless power from a wireless power transmitter by a wireless power receiver based on detection of a foreign object in a wireless power transfer system is provided. The method comprises receiving a digital ping from the wireless power transmitter; transmitting an identification and configuration packets to the wireless power transmitter; transmitting a foreign object detection state packet which indicates a reference Q factor ($Q_{ref}$) of the wireless power receiver to the wireless power transmitter; and receiving wireless power through magnetic coupling from the wireless power transmitter based on the foreign object detection result of the wireless power transmitter using the reference Q factor.

Here, the reference Q factor is a Q factor of a reference wireless power transmitter with respect to the wireless power receiver in the absence of a nearby foreign object, wherein the reference Q factor may be larger than or equal to the minimum reference Q factor ($Q_{ref\_min}$) required for an arbitrary wireless power receiver compatible with the reference wireless power transmitter.

In one aspect, provided that a first Q factor ($Q_{RX}$) of a reference wireless power transmitter with respect to the arbitrary wireless power receiver in the absence of a nearby foreign object is the same as a second Q factor ($Q_{RX,RFO}$) of the reference wireless power transmitter with respect to the arbitrary wireless power receiver in the presence of a nearby representative foreign object (RFO), if the first Q factor is denoted as a threshold Q factor ($Q_{ref,OX}$) by which the representative foreign object may be detected, the minimum Q factor value may be defined based on the threshold Q factor.

In another aspect, when ΔQ factor=second Q factor−first Q factor, the minimum reference Q factor may be defined based on the first Q factor which satisfies ΔQ factor=0; the first Q factor may be a Q factor of a reference wireless power transmitter with respect to the arbitrary wireless power receiver in the absence of a nearby foreign object; and the second Q factor may be a Q factor of the reference wireless power transmitter with respect to the arbitrary wireless power receiver in the presence of a nearby representative foreign object.

In yet another aspect, the minimum reference Q factor may be defined as a value compensating the threshold Q factor for a Q factor measurement error.

In still another aspect, the threshold Q factor may range from 22 to 23, the Q factor measurement error may lie within 10% of the threshold Q factor, and the minimum reference Q factor may range from 24 to 26.

In still yet another aspect, the threshold Q factor may be 22.2.

In a still further aspect, the minimum reference Q factor may range from 24.7 to 25.

In a still additional aspect, the representative foreign object may be a representative foreign object which maximizes the threshold Q factor among various types of representative foreign objects.

According to another aspect of the present invention, a method for transferring wireless power to a wireless power receiver by a wireless power transmitter based on detection of a foreign object in a wireless power transfer system is provided. The method comprises transmitting a digital ping to the wireless power receiver; receiving an identification and configuration packets from the wireless power receiver; receiving a foreign object detection state packet which indicates a reference Q factor ($Q_{ref}$) of the wireless power receiver from the wireless power receiver; performing foreign object detection by using the reference Q factor; and transferring wireless power through magnetic coupling to the wireless power receiver based on the foreign object detection result.

Here, the reference Q factor is a Q factor of a reference wireless power transmitter with respect to the wireless power receiver in the absence of a nearby foreign object, wherein the reference Q factor may be larger than or equal to the minimum reference Q factor ($Q_{ref\_min}$) required for an arbitrary wireless power receiver compatible with the reference wireless power transmitter.

In one aspect, provided that a first Q factor ($Q_{RX}$) of a reference wireless power transmitter with respect to the arbitrary wireless power receiver in the absence of a nearby foreign object is the same as a second Q factor ($Q_{RX,RFO}$) of the reference wireless power transmitter with respect to the arbitrary wireless power receiver in the presence of a nearby representative foreign object (RFO), if the first Q factor is denoted as a threshold Q factor ($Q_{ref,OX}$) by which the representative foreign object may be detected, the minimum Q factor value may be defined based on the threshold Q factor.

In another aspect, when ΔQ factor=second Q factor−first Q factor, the minimum reference Q factor may be defined based on the first Q factor which satisfies ΔQ factor=0; the first Q factor may be a Q factor of a reference wireless power transmitter with respect to the arbitrary wireless power receiver in the absence of a nearby foreign object; and the second Q factor may be a Q factor of the reference wireless power transmitter with respect to the arbitrary wireless power receiver in the presence of a nearby representative foreign object.

In yet another aspect, the minimum reference Q factor may be defined as a value compensating the threshold Q factor for a Q factor measurement error.

In still another aspect, the threshold Q factor may range from 22 to 23, the Q factor measurement error may lie within 10% of the threshold Q factor, and the minimum reference Q factor may range from 24 to 26.

In still yet another aspect, the threshold Q factor may be 22.2.

According to yet another aspect of the present invention, a method for testing foreign object detection performance of a wireless power receiver in a wireless power transfer system is provided. The method comprises measuring a Q factor with respect to a wireless power receiver at a predetermined test position on a reference wireless power transmitter; comparing the measured Q factor with a reference Q factor provided by the wireless power receiver; and if the reference Q factor is larger than or equal to the minimum reference Q factor ($Q_{ref\_min}$) required for an arbitrary wireless power receiver compatible with the reference wireless power transmitter, and the measured Q factor belongs to an error range of the reference Q factor, determining a foreign object detection performance test of the wireless power receiver as being successful.

In one aspect, provided that a first Q factor ($Q_{RX}$) of a reference wireless power transmitter with respect to the arbitrary wireless power receiver in the absence of a nearby foreign object is the same as a second Q factor ($Q_{RX,RFO}$) of the reference wireless power transmitter with respect to the arbitrary wireless power receiver in the presence of a nearby representative foreign object (RFO), if the first Q factor is denoted as a threshold Q factor ($Q_{ref,OX}$) by which the representative foreign object may be detected, the minimum Q factor value may be defined based on the threshold Q factor.

In another aspect, when ΔQ factor=second Q factor−first Q factor, the minimum reference Q factor may be defined based on the first Q factor which satisfies ΔQ factor=0; the first Q factor may be a Q factor of a reference wireless power transmitter with respect to the arbitrary wireless power receiver in the absence of a nearby foreign object; and the second Q factor may be a Q factor of the reference wireless power transmitter with respect to the arbitrary wireless power receiver in the presence of a nearby representative foreign object.

In yet another aspect, the minimum reference Q factor may be defined as a value compensating the threshold Q factor for a Q factor measurement error.

In still another aspect, the threshold Q factor may range from 22 to 23, the Q factor measurement error may lie within 10% of the threshold Q factor, and the minimum reference Q factor may range from 24 to 26.

In still yet another aspect, the threshold Q factor may be 22.2.

BRIEF DESCRIPTION OF THE DRAWINGS

FIG. 10 illustrates a structure of a sync pattern according to one embodiment of the present invention.

FIG. 13 is a perspective view of a primary coil and shielding unit of a reference wireless power transmitter; and four representative foreign objects used for an experiment of the present embodiment.

FIG. 16 is a perspective view of a primary coil and shielding unit of a reference wireless power transmitter; a secondary coil, shielding unit, and metal case member of a reference wireless power receiver; and representative foreign objects used for an experiment of the present embodiment.

FIG. 21 is a block diagram of an FOD state packet according to one embodiment of the present invention.

DESCRIPTION OF EXEMPLARY
EMBODIMENTS

The term "wireless power" used in what follows refers to an energy in an arbitrary form related to an electric, magnetic, or electromagnetic field transferred to a wireless power receiver from a wireless power transmitter without involving physical electromagnetic conductors. Wireless power may also be called a wireless power signal and indicate an oscillating magnetic flux enclosed by a primary and secondary coils. For example, power transform in a system for charging devices including mobile phones, cordless phones, iPods, MP3 players, and headsets may be described in this document. In general, basic operating principles of wireless power transfer include, for example, a method for transferring power through magnetic coupling, method for transferring power through radio frequency (RF), method for transferring power through microwaves, and method for transferring power through ultrasonic waves.

Figure 1:
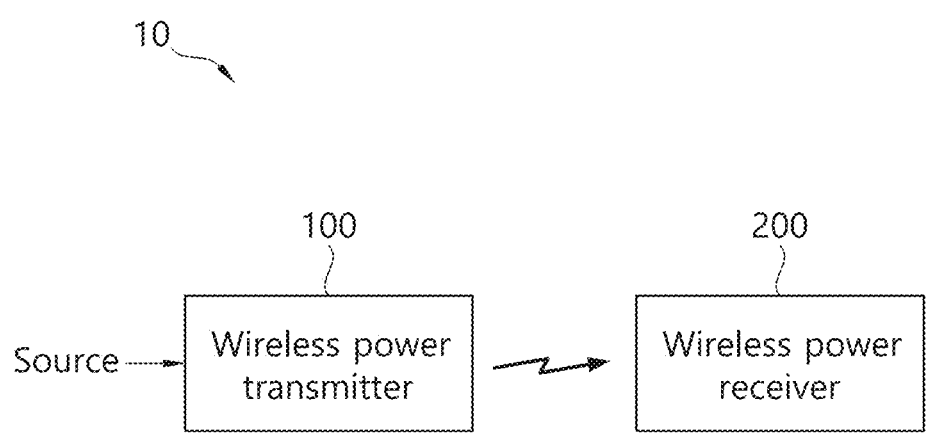
FIG. 1 illustrates a block diagram of a wireless power system 10 according to one embodiment of the present invention.

FIG. 1 illustrates a block diagram of a wireless power system 10 according to one embodiment of the present invention.

Referring to FIG. 1, a wireless power system 10 comprises a wireless power transmitter 100 and a wireless power receiver 200.

The wireless power transmitter 100 receives power from an external power source S and generates a magnetic field. The wireless power receiver 200 receives power wirelessly by generating a current from the generated magnetic field.

Also, in the wireless power system 10, the wireless power transmitter 100 and wireless power receiver 200 may transmit and receive various information required for wireless power transfer. Here, communication between the wireless power transmitter 100 and wireless power receiver 200 may be performed by using either in-band communication using magnetic fields used for wireless power transfer or out-band communication using a separate communication carrier.

Here, the wireless power transmitter 100 may be provided as a fixed or mobile type apparatus. Fixed-type examples include transmitters embedded in the indoor ceiling or wall or furniture such as a table; transmitters installed in the form of an implant in an outdoor parking area, bus station, or subway station; and those installed in a transportation means such as a vehicle or train. A mobile type wireless power transmitter 100 may be implemented as part of another apparatus such as a mobile apparatus having a portable weight and size or cover of a notebook computer.

The wireless power receiver 200 has to be interpreted as a comprehensive concept including various types of electronic devices equipped with batteries and various types of home appliances which receive operating power wirelessly instead of through a power cable. Typical examples of the wireless power receiver 200 include a portable terminal, cellular phone, smartphone, Personal Digital Assistant (PDA), Portable Media Player (PMP), Wibro terminal, tablet, pablet, notebook, digital camera, navigation terminal, television, and electric vehicle (EV).

Figure 2:
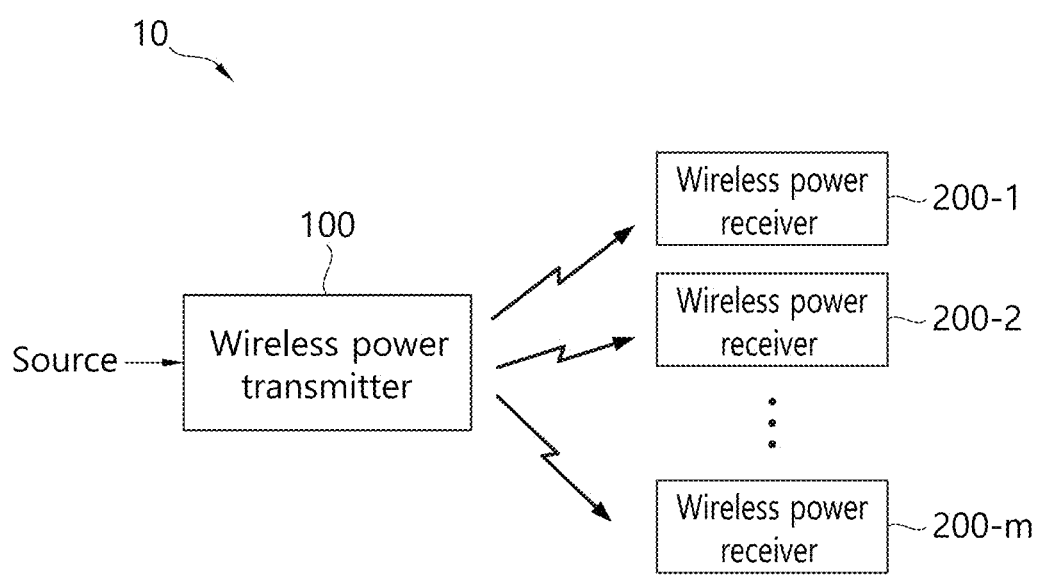
FIG. 2 illustrates a block diagram of a wireless power system 10 according to another embodiment of the present invention.

The wireless power system 100 may include one or more wireless power receivers 200. Although FIG. 1 illustrates a situation in which a wireless power transmitter 100 and wireless power receiver 200 give and take power in a one-to-one fashion to and from each other, it is also possible that one wireless power transmitter 100 transfers power to a plurality of wireless power receivers 200-1, 200-2, . . . 200-M as shown in FIG. 2. In particular, if wireless power transfer is performed through magnetic resonance, one wireless power transmitter 100 may transfer power to multiple wireless power receivers 200-1, 200-2, . . . , 200-M simultaneously by employing a simultaneous transmission method or time division transmission method.

Also, although FIG. 1 illustrates a situation in which a wireless power transmitter 100 transmits power directly to a wireless power receiver 200, a separate wireless power transceiver such as a relay or repeater meant for increasing a wireless power transfer distance may be used between the wireless power transmitter 100 and the wireless power receiver 200. In this case, power may be transmitted from the wireless power transmitter 100 to a wireless power transceiver, and the wireless power transceiver may again transmit power to the wireless power receiver 200.

In what follows, a wireless power receiver, power receiver, and receiver refer to the wireless power receiver

200. Also, a wireless power transmitter, power transmitter, and transmitter mentioned in the present specification all refer to the wireless power transmitter 100.

Figure 3:
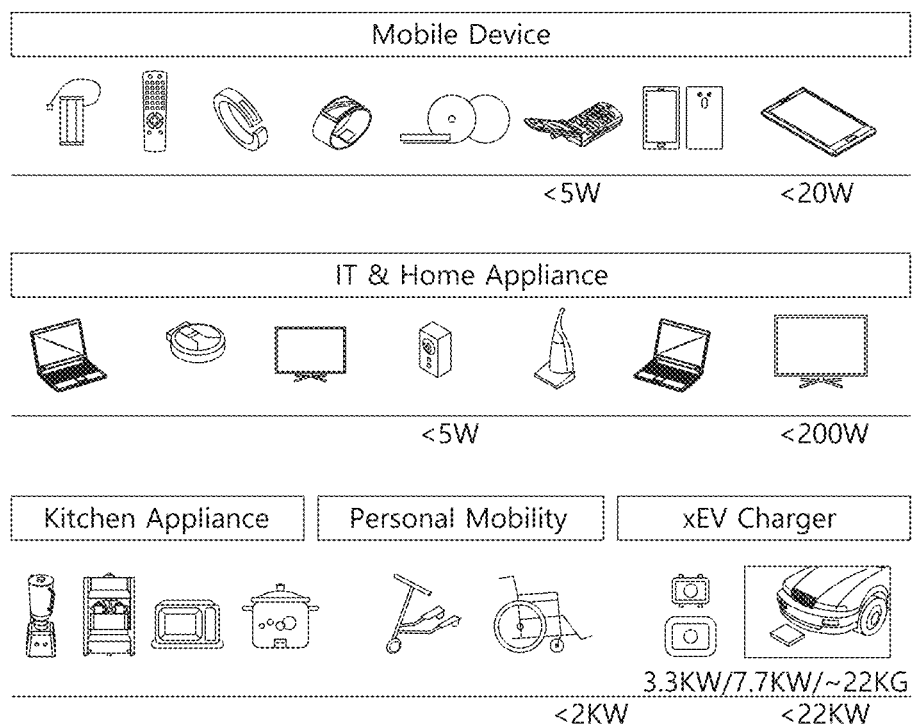
FIG. 3 illustrates an embodiment of various electronic devices to which a wireless power transfer system is applied.

FIG. 3 illustrates an embodiment of various electronic devices to which a wireless power transfer system is applied.

FIG. 3 shows and classifies electronic devices according to the amount of transmitted and received power to and from a wireless power transfer system. Referring to FIG. 3, a small power (less than about 5 W or 30 W) wireless charging method may be applied to wearable devices such as a smart watch, smart glass, Head Mounted Display (HMD), smart ring; and mobile electronic devices (or portable electronic devices) such as an earphone, remote controller, smartphone, PDA, and table PC.

A mid-power (less than about 50 W or 200 W) wireless charging method may be applied to middle/small home appliances such as a notebook, robot cleaner, TV, sound equipment, vacuum cleaner, and monitor. A large power (less than about 2 kW or 22 kW) wireless charging method may be applied to kitchen appliances such as a blender, microwave oven, and electric rice cooker; and personal mobility devices (or electronic device/mobility means) such as a wheelchair, electric kickboard, electric bicycle, and electric vehicle.

The aforementioned (or shown in FIG. 1) electronic devices/mobility means may each include a wireless power receiver to be described later. Therefore, the aforementioned electronic devices/mobility means may be charged by receiving power wirelessly from a wireless power transmitter.

In what follows, descriptions are given with respect to a mobile device to which a wireless power transfer system is applied; however, the descriptions given below are only an embodiment, and a wireless charging method according to the present invention may be applied to various electronic devices described above.

Wireless power transmitters and receivers may provide a very convenient user experience and interface (UX/UI). In other words, a smart wireless charging service may be provided. A smart wireless charging service may be implemented based on the UX/UI of a smartphone equipped with a wireless power transmitter. To support the application, an interface between a processor of the smartphone and a wireless power receiver allows "drop and play" bilateral communication between a wireless power transmitter and receiver.

As one example, a user may experience a smart wireless charging service in a hotel. When the user enters a hotel room and put his or her smartphone on a wireless charger inside the room, the wireless charger transmits wireless power to the smartphone, and the smartphone receives the wireless power. During this process, the wireless charger transmits information about the smart wireless charging service to the smartphone. If the smartphone detects being put on a wireless charger, detects reception of wireless power, or receives information about a smart wireless charging service from the wireless charger, the smartphone enters a state in which the smartphone inquires of the user about whether to opt in to an additional feature. To this purpose, the smartphone may display a message on the screen with or without an alarm sound. An example of the message may include a sentence such as "Welcome to ### hotel. Select "Yes" to activate smart charging functions: Yes|No Thanks.". The smartphone receives a user input which selects Yes or No Thanks and performs the next procedure selected by the user. If Yes is selected, the smartphone transmits the corresponding information to the wireless charger. And the smartphone and wireless charger performs a smart charging function in conjunction with each other.

The smart wireless charging service may also include receiving auto-filled WiFi credentials. For example, a wireless charger transmits a WiFi credential to the smartphone, and the smartphone automatically enters the WiFi credential received from the wireless charger by executing an appropriate application.

The smart wireless charging service may also execute a hotel application providing a hotel promotion or obtain remote check-in/check-out and contact information.

As another example, the user may experience a smart wireless charging service inside a car. If the user gets in a car and puts his or her smartphone on a wireless charger, the wireless charger transmits wireless power to the smartphone, and the smartphone receives wireless power. During the procedure, the wireless charger transmits information about the smart wireless charging service to the smartphone. If the smartphone detects being put on a wireless charger, detects reception of wireless power, or receives information about a smart wireless charging service from the wireless charger, the smartphone enters a state in which the smartphone inquires identity of the user.

In this state, the smartphone is automatically connected through WiFi and/or Bluetooth. The smartphone may display a message on the screen with or without an alarm sound. An example of the message may include a sentence such as "Welcome to your car. Select "Yes" to synch device with in-car controls: Yes|No Thanks.". The smartphone receives a user input which selects Yes or No Thanks and performs the next procedure selected by the user. If Yes is selected, the smartphone transmits the corresponding information to the wireless charger. And by activating in-car application/display software, the smartphone and wireless charger may perform an in-car smart control function in conjunction with each other. The user may enjoy desired music and check a normal map position. The in-car application/display software may include a function which provides synchronization access for passengers.

As yet another example, the user may experience smart wireless charging at home. If the user goes into a room and puts his or her smartphone on a wireless charger, the wireless charger transmits wireless power to the smartphone, and the smartphone receives wireless power. During the procedure, the wireless charger transmits information about the smart wireless charging service to the smartphone. If the smartphone detects being put on a wireless charger, detects reception of wireless power, or receives information about a smart wireless charging service from the wireless charger, the smartphone enters a state in which the smartphone inquires of the user about whether to opt in to an additional feature. To this purpose, the smartphone may display a message on the screen with or without an alarm sound. An example of the message may include a sentence such as "Hi xxx. Would you like to activate night mode and secure the building?: Yes|No Thanks.". The smartphone receives a user input which selects Yes or No Thanks and performs the next procedure selected by the user. If Yes is selected, the smartphone transmits the corresponding information to the wireless charger. The smartphone and wireless charger may at least recognize a pattern of the user and advise the user to close a door or window, turn off the light, or set the alarm.

The standard for wireless power transmission includes standards developed by the Wireless Power Consortium (WPC), Air Fuel Alliance (AFA), and Power Matters Alliance (PMA)

The WPC standard defines a baseline power profile (BPP) and extended power profile (EPP). BPP pertains to a wireless power transmitter and receiver supporting power transmission of 5 W, and EPP pertains to a wireless power transmitter and receiver supporting power transmission ranging from 5 W to 30 W.

Various wireless power transmitters and receivers using different power levels may be covered by the respective standards and may be classified into different power classes or categories.

For example, the WPC classifies wireless power transmitters and receivers into power class (PC)-1, PC0, PC1, and PC2; and provides a standard document for each PC. The PC-1 standard is related to a wireless power transmitter and receiver providing guaranteed power less than 5 W. Applications of the PC-1 class include wearable devices such as a smart watch.

The PC0 standard is related to a wireless power transmitter and receiver providing guaranteed power of 5 W. The PC0 standard includes EPP, the guaranteed power of which reaches up to 30 W. Although in-band (IB) communication is a mandatory communication protocol of the PC0 standard, out-of-band (OOB) communication which is used as an optional backup channel may also be employed. A wireless power receiver may check whether OOB is supported by setting an OBB flag within a configuration packet. A wireless power transmitter supporting OOB may enter an OOB handover phase by transmitting a bit-pattern for OOB handover as a response to the configuration packet. The response to the configuration packet may be NAK, ND, or newly defined 8-bit pattern. Applications of the PC0 include smartphones.

The PC1 standard is related to a wireless power transmitter and receiver providing guaranteed power ranging from 30 W to 150 W. OOB communication is a mandatory communication channel for PC1, and IB communication is used for initialization to the OOB communication and link establishment. A wireless power transmitter may enter an OOB handover phase by transmitting a bit-pattern for OOB handover as a response to a configuration packet. Applications of the PC1 include laptops or power tools.

The PC2 standard is related to a wireless power transmitter and receiver providing guaranteed power ranging from 200 W to 2 kW, and its applications include kitchen appliances.

As described above, the PC may be distinguished according to the power level, and whether to support compatibility between the same PCs may be determined as optional or mandatory. Here, compatibility between the same PCs indicates that power transmission and reception are possible between the same PCs. For example, when a wireless power transmitter of PC x is capable of charging a wireless power receiver of the same PC x, it may be regarded that compatibility between the same PCs is maintained. Similarly, compatibility between different PCs may also be supported. Here, compatibility between different PCs indicates that power transmission and reception is allowed between different PCs. For example, when a wireless power transmitter of PC x is capable of charging a wireless power receiver of PC y, it may be regarded that compatibility between different PCs is maintained.

Support of compatibility between PCs is a very important issue in terms of user experience and infrastructure construction. However, it should be noted that maintaining compatibility between PCs raises various technical problems as described below.

In the case of compatibility between the same PCs, for example, a wireless power receiver based on a laptop charging scheme where charging may be performed reliably only when power is transmitted continuously may run into a problem in receiving power reliably from a power tool-based wireless power transmitter which transmits power intermittently, even if the power tool-based wireless power transmitter is of the same PC. Also, in the case of compatibility between different PCs, for example, if a wireless power transmitter of which the minimum guaranteed power is 200 W transmits power to a wireless power receiver of which the maximum guaranteed power is 5 W, the wireless power receiver may be damaged from overvoltage. As a result, it is difficult to use PC as an indicator/criterion representing/indicating compatibility.

In what follows, 'profile' will be newly defined as an indicator/criterion representing/indicating compatibility. In other words, between wireless power transmitter and receiver having the same 'profile', compatibility is maintained, and reliable power transmission and reception is allowed while power transmission and reception is not allowed between wireless power transmitter and receiver having different 'profiles'. A profile may be defined according to compatibility and/or application irrespective (or independently) of a power class.

For example, profiles may be divided into four types: i) mobile, ii) power tool, iii) kitchen, and iv) wearable profile.

In the case of 'mobile' profile, PC may be defined as PC0 and/or PC1; communication protocol/method as IB and OOB; operating frequency as 87 to 205 kHz; and application examples may include smartphone and laptop computer.

In the case of 'power tool' profile, PC may be defined as PC1; communication protocol/method as IB; operating frequency as 87 to 145 kHz; and application examples may include a power tool.

In the case of 'kitchen' profile, PC may be defined as PC2; communication protocol/method as NFC; operating frequency as being less than 100 kHz; and application examples may include kitchen/home appliances.

In the case of 'wearable' profile, PC may be defined as PC-1; communication protocol/method as IB; operating frequency as 87 to 205 kHz; and application examples may include wearable devices attached to the human body.

Maintaining compatibility between the same profiles may be mandatory while maintaining compatibility between different profiles may be optional.

The profiles (mobile, power tool, kitchen, and wearable profiles) may be generalized to the first to the n-th profiles, and a new profile may be added or replace an arbitrary one according to the WPC specification and embodiment.

If a profile is defined as described above, a wireless power transmitter transmits power selectively only to the wireless power receivers of the same profile as the wireless power transmitter, thereby allowing power transmission to be performed more reliably. Also, since a burden on a wireless power transmitter is relieved, and power transmission to an incompatible wireless power receiver is not attempted, an advantageous effect is obtained that a risk of damaging a wireless power receiver is reduced.

The PC1 within the 'mobile' profile may be defined based on the PC0 by adopting selective expansion such as OOB while the 'power tool' profile may be defined by a simply modified version of the PC1 'mobile' profile. Also, the profiles have been defined for the purpose of maintaining compatibility between the same profiles so far; in a future, however, the technology may be advanced in a direction to maintain compatibility between different profiles. A wireless power transmitter or wireless power receiver may inform the other of its profile through various means.

The AFA standard refers to a wireless power transmitter as a power Transmitting Unit (PTU) and a wireless power receiver as a Power Receiving Unit (PRU). PUTS are classified to a plurality of classes as shown in Table 1 while PRUs are classified to a plurality of categories as shown in Table 2.

TABLE 1

| | $P_{TX\_IN\_MAX}$ | Requirement for supporting minimum category | Minimum value for the maximum number of supported devices |
|---|---|---|---|
| Class 1 | 2 W | 1x category 1 | 1x category 1 |
| Class 2 | 10 W | 1x category 3 | 2x category 2 |
| Class 3 | 16 W | 1x category 4 | 2x category 3 |
| Class 4 | 33 W | 1x category 5 | 3x category 3 |
| Class 5 | 50 W | 1x category 6 | 4x category 3 |
| Class 6 | 70 W | 1x category 7 | 5x category 3 |

TABLE 2

| PRU | $P_{TX\_OUT\_MAX}$ | Example application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet, pablet |
| Category 5 | 25 W | Small form factor laptop computer |
| Category 6 | 37.5 W | General laptop computer |
| Category 7 | 50 W | Home appliance |

Figure 4:
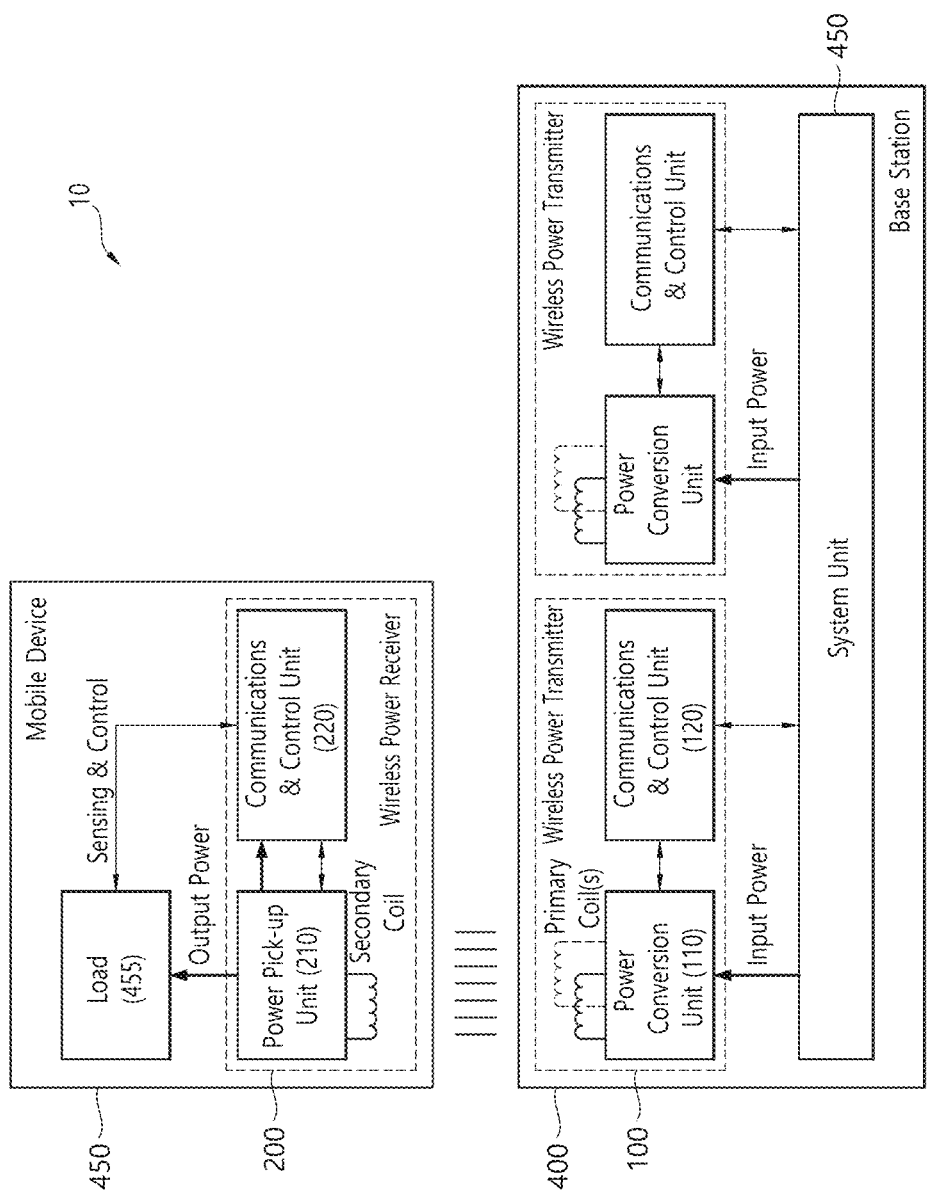
FIG. 4 illustrates a block diagram of a wireless power transfer system according to another embodiment of the present invention.

As shown in Table 1, the maximum output power capability of a class n PTU is larger than or equal to the $P_{TX\_IN\_MAX}$ of the corresponding class. A PRU may not draw power larger than that specified in the corresponding category. FIG. 4 illustrates a block diagram of a wireless power transfer system according to another embodiment of the present invention.

Referring to FIG. 4, a wireless power transfer system 10 comprises a mobile device 450 receiving power wirelessly and a base station 400 transmitting power wirelessly.

The base station 400 is an apparatus providing inductive or resonant power and may include at least one wireless power transmitter 100 and a system unit 405. The wireless power transmitter 100 may transmit inductive or resonant power and control the transmission. The wireless power transmitter 100 may include a power conversion unit 110 which converts electric energy to a power signal by generating a magnetic field through a primary coil(s) and a communication & control unit 120 which controls communication with and transmission of power to the wireless power receiver 200 so that power may be transmitted at an appropriate level. The system unit 405 may perform control of miscellaneous operations of the base station 100, such as input power provisioning, control of a plurality of wireless power transmitters, and control of a user interface.

The primary coil may generate an electromagnetic field by using alternating power (or voltage or current). The primary coil may receive alternating power (or voltage or current) at a specific frequency produced at the power conversion unit 110 and accordingly generate a magnetic field of the specific frequency. A magnetic field may be generated in a non-radial or radial direction, which is received by the wireless power receiver 200 to generate a current. In other words, the primary coil transmits power wirelessly.

When magnetic induction is used, the primary and secondary coils may have any relevant shape and may be constructed by being wound around a structure of high permeability such as ferrite or amorphous metal. The primary coil may also be called a primary core, primary winding, or primary loop antenna. Meanwhile, the secondary coil may also be called a secondary coil, secondary winding, secondary loop antenna, or pickup antenna.

When magnetic resonance is used, the primary and secondary coils may be provided in the form of a primary resonant antenna and a second resonant antenna, respectively. A resonant antenna may be built from a resonant structure including a coil and capacitor. At this time, the resonant frequency of the resonant antenna is determined by inductance of the coil and capacitance of the capacitor. Here, the coil may be in the form of a loop. Also, a core may be disposed inside the loop. The type of core may include a physical core such as one made of ferrite core; or an air core.

Energy transfer between the primary resonant antenna and secondary resonant antenna may be achieved through magnetic resonance. Magnetic resonance refers to the phenomenon where, when one resonant antenna generates a near-field corresponding to the resonant frequency, and another resonant antenna is located around the near field, the two resonant antennas are coupled to each other, and energy transfer with a high efficiency is performed between the resonant antennas. If a magnetic field corresponding to a resonant frequency is generated between the primary resonant antenna and the secondary resonant antenna, the primary and secondary resonant antennas resonate with each other. Accordingly, the magnetic field generated by the first resonant antenna is concentrated to the secondary resonant antenna with a higher efficiency than the general case where a magnetic field generated by the primary resonant antenna is radiated to the free space, and thereby energy may be transmitted from the primary resonant antenna to the second resonant antenna with a high efficiency. Magnetic induction may be achieved in a similar manner as magnetic resonance, but in this case, the frequency of a magnetic field doesn't have to be the resonant frequency. In the magnetic induction, however, matching of loops forming the primary and secondary coils is needed, and the spacing between the loops has to be very close.

Although not shown in the figure, the wireless power transmitter 1100 may further include a communication antenna. A communication antenna may transmit and receive a communication signal by using a communication carrier in addition to magnetic field communication. For example, a communication antenna may transmit and receive communication signals such as a WiFi, Bluetooth, Bluetooth LE, ZigBee, and NFC signal.

The communication & control unit 120 may transmit and receive information to and from the wireless power receiver 200. The communication/control unit 120 may include at least one of the IB or OOB communication module.

The IB communication module transmits and receives information by using a magnetic wave having a specific frequency as its center frequency. For example, the communication & control unit 120 may perform in-band communication by placing information in a magnetic wave and transmitting the information through the primary coil or receiving a magnetic wave carrying information through the primary coil. At this time, information may be placed in a magnetic wave or interpret a magnetic wave carrying information by using a modulation method such as binary phase shift keying (BPSK) or amplitude shift keying (ASK) or a coding method such as Manchester coding or non-returnto-zero level (NZR-L) coding. By using the IB communication, the communication & control unit 120 may transmit and receive information up to several meters at a data transmission rate of a few kbps.

The OOB communication module may perform out-band communication through a communication antenna. For example, the communication & control unit 120 may be provided as a short range communication module. Examples of a short range communication module include a WiFi, Bluetooth, Bluetooth LE, ZigBee, and NFC module.

The communication & control unit 120 may control the overall operation of the wireless power transmitter 100. The communication & control unit 120 may perform computation and processing of various types of information and control each individual element of the wireless power transmitter 100.

The communication & control unit 120 may be implemented by a computer or a device similar to the computer by using hardware, software, or a combination of both. In a hardware form, the communication & control unit 120 may be provided in the form of an electronic circuit which performs a control function by processing an electric signal, and in a software form, the communication & control unit 120 may be provided in the form of a program which drives the communication & control unit 120.

The communication & control unit 120 may control transmission power by controlling an operating point. The controlled operating point may correspond to a combination of frequency (or phase), duty cycle, duty ratio, and voltage amplitude. The communication & control unit 120 may control transmission power by adjusting at least one of frequency (or phase), duty cycle, duty ratio, and voltage amplitude. Also, the wireless power transmitter 100 may provide a predetermined power, and the wireless power receiver 200 may control a received power by controlling the resonant frequency.

The mobile device 450 includes a wireless power receiver 200 which receives wireless power through the secondary coil and a load 455 which stores the power received by the wireless power receiver 200 and provides power to the load 455.

The wireless power receiver 200 may include a power pick-up unit 210 and communication & control unit 220. The power pick-up unit 210 may receive wireless power through the secondary coil and convert the received power to electric energy. The power pick-up unit 210 rectifies an alternating current signal obtained through the secondary coil to convert the AC signal to a DC signal. The communication & control unit 220 may control transmission and reception of wireless power (transmission and reception of power).

The secondary coil may receive wireless power transmitted from the wireless power transmitter 100. The secondary coil may receive power by using a magnetic field generated by the primary coil. Here, if a specific frequency is a resonant frequency, magnetic resonance is developed between the primary and secondary coils, and power may be transmitted more efficiently.

Although not shown in FIG. 4, the communication/control unit 220 may further include a communication antenna. The communication antenna may transmit and receive a communication signal by using a communication carrier in addition to magnetic field communication. For example, a communication antenna may transmit and receive a communication signal such as a WiFi, Bluetooth, Bluetooth LE, ZigBee, or NFC signal.

The communication & control unit 220 may transmit and receive information to and from the wireless power transmitter 100. The communication/control unit 220 may include at least one of the IB or OOB communication module.

The IB communication module transmits and receives information by using a magnetic wave having a specific frequency as its center frequency. For example, the communication & control unit 220 may perform in-band communication by placing information in a magnetic wave and transmitting the information through the secondary coil or receiving a magnetic wave carrying information through the secondary coil. At this time, information may be placed in a magnetic wave or interpret a magnetic wave carrying information by using a modulation method such as binary phase shift keying (BPSK) or amplitude shift keying (ASK) or a coding method such as Manchester coding or non-return-to-zero level (NZR-L) coding. By using the IB communication, the communication & control unit 220 may transmit and receive information up to several meters at a data transmission rate of a few kbps.

The OOB communication module may perform out-band communication through a communication antenna. For example, the communication & control unit 220 may be provided as a short range communication module.

Examples of a short range communication module include a WiFi, Bluetooth, Bluetooth LE, ZigBee, and NFC module.

The communication & control unit 220 may control the overall operation of the wireless power transmitter 100. The communication & control unit 220 may perform computation and processing of various types of information and control each individual element of the wireless power receiver 200.

The communication & control unit 220 may be implemented by a computer or a device similar to the computer by using hardware, software, or a combination of both. In a hardware form, the communication & control unit 220 may be provided in the form of an electronic circuit which performs a control function by processing an electric signal, and in a software form, the communication & control unit 220 may be provided in the form of a program which drives the communication & control unit 120.

The load 455 may be a battery. A battery may store energy by using power produced from the power pick-up unit 210. Meanwhile, a battery does not necessarily have to be included in the mobile device 450. For example, the battery may be provided as an external entity that may be attached to or detached from the mobile device 450. In another example, the wireless power receive 200 may include a driving means which drives various operations of an electronic device in the place of the battery.

Although it is shown in the figure that the mobile device 450 includes the wireless power receiver 200, and the base station 400 includes the wireless power transmitter 100, the wireless power receiver 200 may be considered to be the same as the mobile device 450, and the wireless power transmitter 100 may also be considered to be the same as the base station 400.

In what follows, the coil or coil unit may also be referred to as a coil assembly, coil cell, or cell by including a coil and at least one element adjacent to the coil.

Figure 5:
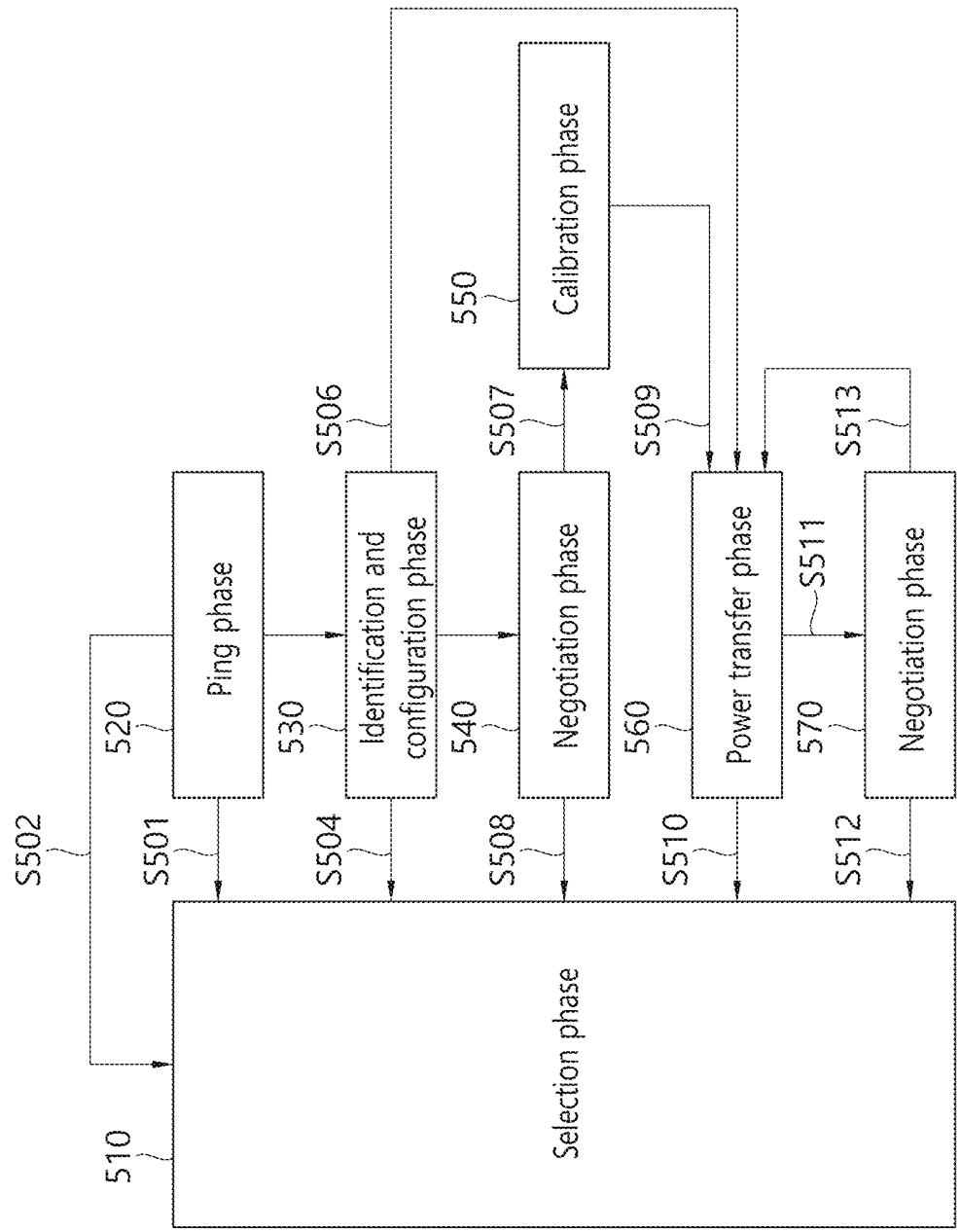
FIG. 5 is a state transition diagram illustrating a wireless power transfer procedure.

FIG. 5 is a state transition diagram illustrating a wireless power transfer procedure.

Referring to FIG. 5, power transfer from a wireless power transmitter to a receiver according to one embodiment of the present invention may largely comprise a selection phase 510, ping phase 520, identification and configuration phase 530, negotiation phase 540, calibration phase 550, power transfer phase 560, and renegotiation phase 570.

If power transfer is started or a specific error or specific event is detected while power transfer is conducted, the wireless power transmitter transitions to the selection phase 510 which includes, for example, S502, S504, S508, S510, and S512. Here, a specific error and specific event may be clearly understood through descriptions given below. Also, in the selection phase 510, a wireless power transmitter may monitor whether an object exists on the interface surface. If the wireless power transmitter detects that an object is placed on the surface of the interface, the wireless power transmitter may transition to the ping phase 520. In the selection phase 510, the wireless power transmitter may transmit an analog ping signal composed of very short pulses and detect whether an object exists on an active area of the interface surface based on a current change of a transmitter coil or primary coil.

If an object is detected in the selection phase 510, the wireless power transmitter may measure the quality factor (Q factor) of a wireless resonance circuit (for example, power transfer coil and/or resonant capacitor). In one embodiment of the present invention, if an object is detected in the selection phase 510, the Q factor may be measured to determine whether a wireless power receiver is placed in a charging area together with a foreign object. Inductance and/or series resistance value of a coil included in the wireless power transmitter may be reduced due to a change of the surroundings, which accordingly reduces the Q factor. To determine existence of a foreign object by using the measured Q factor, the wireless power transmitter may receive, from the wireless power receiver, a reference Q factor measured previously when a foreign object is not placed in the charging area. In the negotiation phase S540, existence of a foreign object may be determined by comparing the received reference Q factor with the measured Q factor. However, in the case of a wireless power receiver the reference Q factor of which is low-as one example, a specific wireless power receiver may have a low Q factor depending on its type, use, and characteristics, existence of a foreign object may not be readily determined since there is not a noticeable difference between a Q factor measured in the presence of a foreign object and the reference Q factor. Therefore, existence of a foreign object has to be determined by taking into account another determination factor or by using another method.

In another embodiment of the present invention, if an object is detected in the selection phase 510, a Q factor within a specific frequency area (for example, an operating frequency area) may be measured to determine whether a foreign object is disposed together in the charging area. Inductance and/or series resistance value of the coil of the wireless power transmitter may be reduced due to a change of the surroundings, which accordingly changes (shifts) the resonant frequency of the coil of the wireless power transmitter. In other words, the Q factor peak frequency may be shifted, where the Q factor peak frequency is a frequency at which the maximum Q factor is measured within the operating frequency area.

In the ping phase 520, if an object is detected, the wireless power transmitter wakes up the receiver and transmits a digital ping signal to identify whether the detected object is a wireless power receiver. If the wireless power transmitter fails to receive a response signal—for example, a signal strength packet—in response to the digital ping signal, power transfer may transition again to the selection phase 510. Also, in the ping phase 520, if the wireless power transmitter receives, from the receiver, a signal indicating that power transfer has been completed—namely, a charging completion packet, power transfer may transition to the selection phase 510.

If the ping phase 520 is completed, the wireless power transmitter may transition to the identification & configuration phase 530 for identifying the receiver and collecting structure and state information of the receiver.

In the identification & configuration phase 530, if an unexpected packet is received (unexpected packet), a desired packet is not received for a predetermined time period (time out), a packet transmission error is occurred (transmission error), or power transfer contract is not established (no power transfer contact), the wireless power transmitter may transition to the selection phase 510.

The wireless power transmitter may check whether transition to the negotiation phase 540 is needed based on a negotiation field value of the configuration packet received in the identification & configuration phase 530. If it is determined from the checking result that a negotiation is needed, the wireless power transmitter may transition to the negotiation phase 540 and perform a predetermined FOD detection procedure. On the other hand, if it is determined from the checking result that a negotiation is not required, the wireless power transmitter may immediately transition to the power transfer phase 560.

In the negotiation phase, the wireless power transmitter may receive a foreign object detection (FOD) state packet including a reference Q factor. Or the wireless power transmitter may receive an FOD state packet including a reference peak frequency value. Or the wireless power transmitter may receive a state packet including the reference Q factor and reference peak frequency value. At this time, the wireless power transmitter may determine a Q factor threshold value for detecting a foreign object (FO) based on the reference Q factor value. The wireless power transmitter may determine a peak frequency threshold for detecting a foreign object (FO) based on the reference peak frequency value.

The wireless power transmitter may detect whether an FO exists in the charging area by using the determined Q factor threshold for detecting an FO and a currently measured Q factor (the Q factor value measured before the ping phase) and control power transfer according to the result of FO detection. As one example, when an FO is detected, power transfer may be stopped, but the present invention is not limited to the particular case.

The wireless power transmitter may detect whether an FO exists in the charging area by using the determined peak frequency threshold for detecting an FO and a currently measured peak frequency value (the peak frequency value measured before the ping phase) and control power transfer according to the result of FO detection. As one example, when an FO is detected, power transfer may be stopped, but the present invention is not limited to the particular case.

When an FO is detected, the wireless power transmitter may return to the selection phase 510. On the other hand, if an FO is not detected, the wireless power transmitter goes through the calibration phase 550 to enter the power transfer phase 560. More specifically, if no FO is detected, the wireless power transmitter may determine strength of power received by the receiver at the calibration phase 550 and measure power loss at the receiver and transmitter to determine strength of power transmitted by the transmitter. In other words, the wireless power transmitter may predict power loss based on the difference between transmitted power of the transmitter and received power of the receiver at the calibration phase 550. The wireless power transmitter according to one embodiment of the present invention may adjust the threshold for detecting an FO by reflecting the predicted power loss.

In the power transfer phase 560, if an unexpected packet is received (unexpected packet), a desired packet is not received for a predetermined time period (time out), a pre-configured power transfer contract is violated (power transfer contract violation), or charging is completed, the wireless power transmitter may transition to the selection phase 510.

Also, in the power transfer phase 560, if it is needed to reconfigure a power transfer contract according to a state change of the wireless power transmitter, the wireless power transmitter may transition to the renegotiation phase 570. At this time, renegotiation is completed normally, the wireless power transmitter may return to the power transfer phase 560.

The power transfer contract may be configured based on the state of the wireless power transmitter and receiver and characteristic information. As one example, state information of the wireless power transmitter may include the maximum amount of power that may be transmitted and the maximum number of receivers that may be accommodated while state information of the receiver may include required power.

Figure 6:
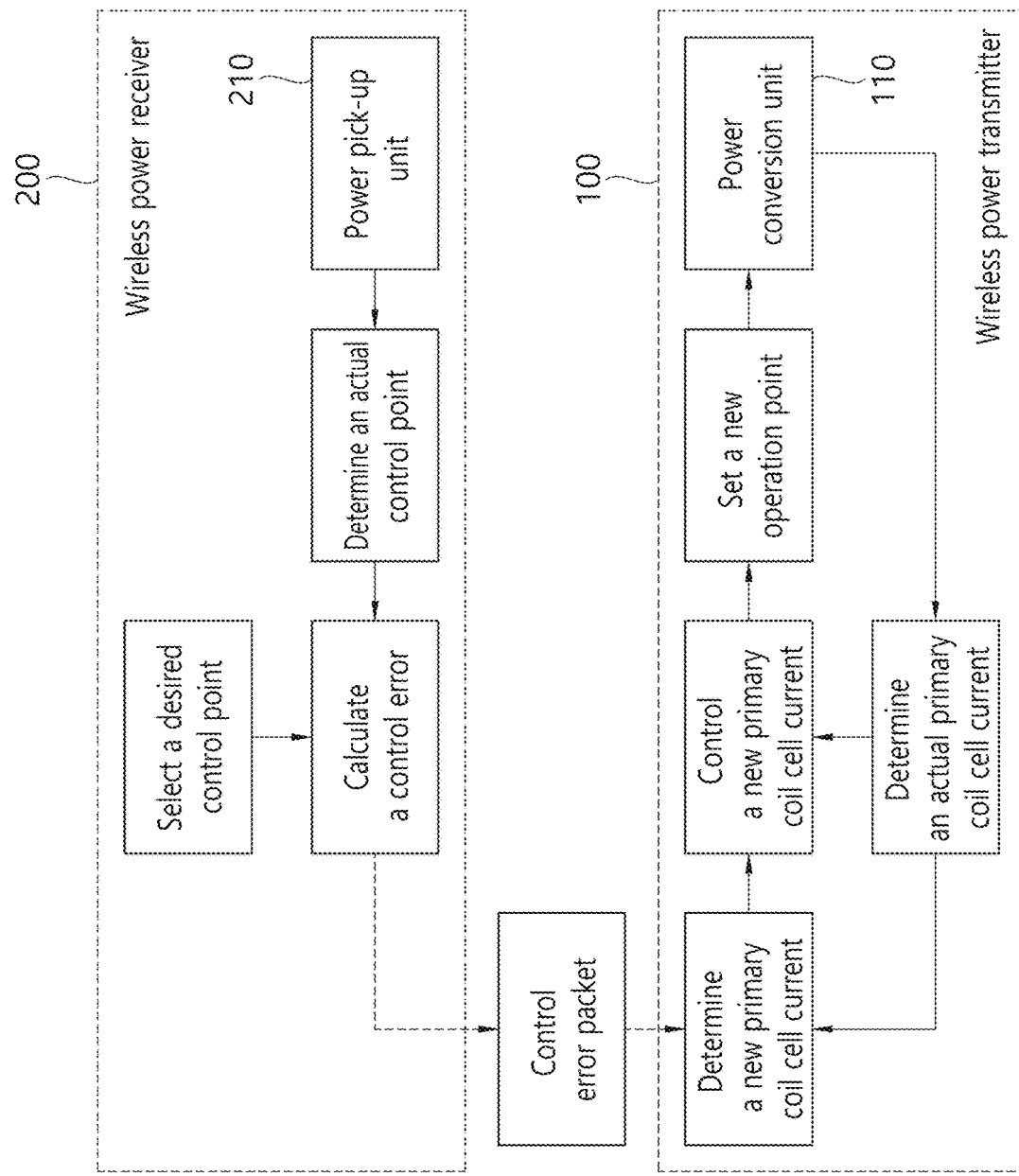
FIG. 6 illustrates a power control method according to one embodiment of the present invention.

FIG. 6 illustrates a power control method according to one embodiment of the present invention.

In the power transfer phase 560 of FIG. 6, the wireless power transmitter 100 and wireless power receiver 200 may control the amount of power transmitted by performing power transmission and reception in conjunction with communication. The wireless power transmitter and wireless power receiver operate at a specific control point. A control point represents a combination of voltage and current provided at the output terminal of the wireless power receiver when power transfer is performed.

To describe in more detail, the wireless power receiver selects a desired control point—a desired output current/voltage or temperate of a mobile device at a specific position—and additionally determines an actual control point that is currently operating. The wireless power receiver may calculate a control error value by using the desired and actual control points and transmit the calculated control error value to the wireless power transmitter in the form of a control error packet.

And the wireless power transmitter may control power transfer by configuring/controlling a new operating point—amplitude, frequency, and duty cycle—by using a received control error packet. Therefore, the control error packet is transmitted/received at predetermined time intervals at the power transfer phase, and as an embodiment, the wireless power receiver may transmit a control error by setting the control error to a negative value in order to reduce the current of the wireless power transmitter but setting the control error as a positive value in order to increase the current. As described above, in an induction mode, the wireless power receiver may control power transfer by transmitting a control error packet to the wireless power transmitter.

In a resonance mode to be described below, power transfer may be performed differently from the induction mode. In the resonance mode, one wireless power transmitter is required to serve a plurality of wireless power receivers simultaneously. However, since power transfer in the induction mode is controlled by communication with one wireless power receiver, it may be difficult to control power transfer to additional wireless power receivers. Therefore, in the resonance mode according to the present invention, a wireless power transmitter transmits predetermined power commonly to wireless power receivers, and a wireless power receiver controls the amount of power to receive by controlling its own resonant frequency. However, it should be noted that the method described with reference to FIG. 6 is not completely excluded from the operations in the resonance mode; rather, control of additional power transfer may be performed according to the method of FIG. 6.

Figure 7:
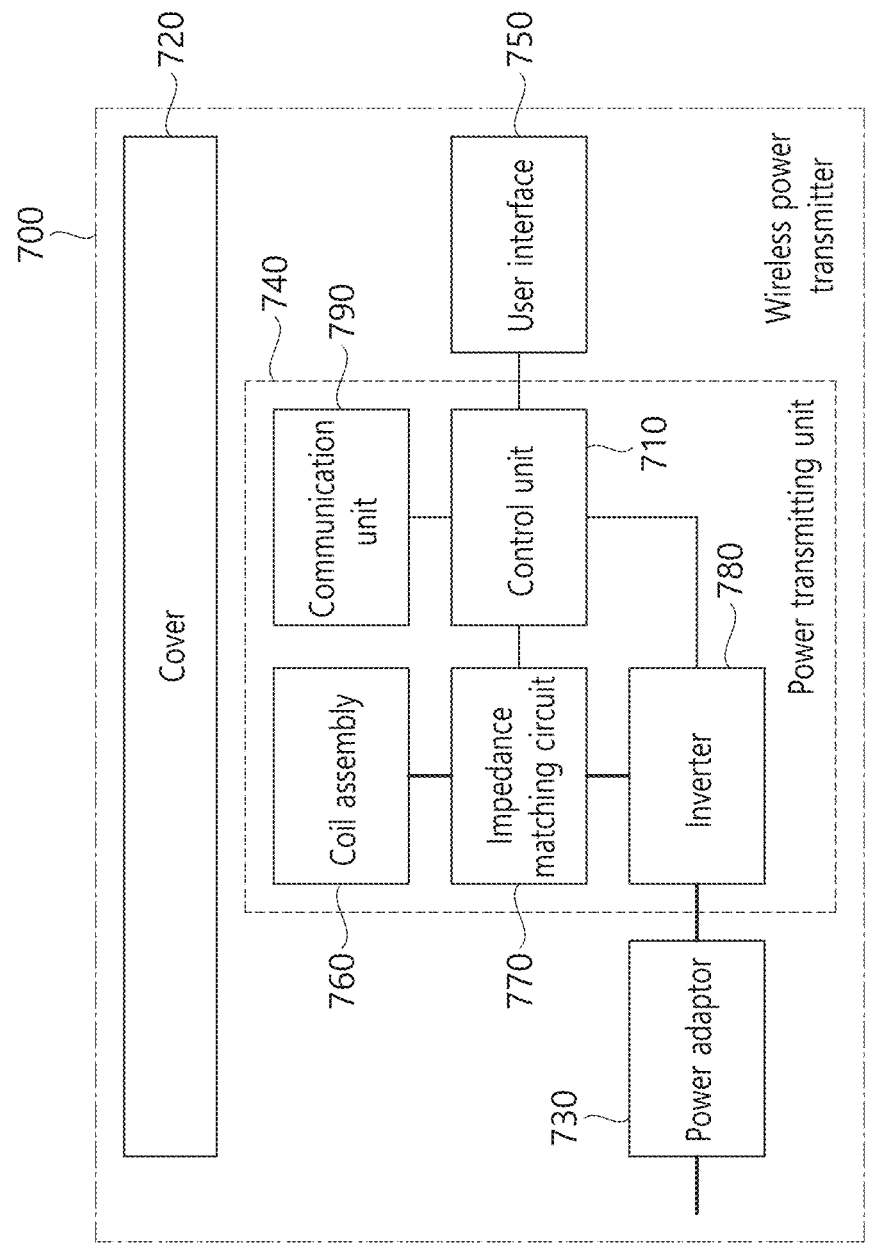
FIG. 7 illustrates a block diagram of a wireless power transmitter according to another embodiment of the present invention.

FIG. 7 illustrates a block diagram of a wireless power transmitter according to another embodiment of the present invention. The wireless power transmitter may belong to a wireless power transfer system in a magnetic resonance or shared mode. A shared mode may refer to the mode in which a wireless power transmitter performs one-to-many communication and charging with wireless power receivers. The shared mode may be implemented by employing a magnetic induction or resonance method.

Referring to FIG. 7, the wireless power transmitter 700 may include at least one of a cover 720 covering a coil assembly, power adaptor 730 which provides power to a power transmitting unit 740, power transmitting unit 740 which transmits power wirelessly, or user interface 750 providing information related to progress of power transfer or other matters. In particular, the user interface 750 may be included optionally or included as other user interface 750 of the wireless power transmitter 700.

The power transmitting unit 740 may include at least one of a coil assembly 760, impedance matching circuit 770, inverter 780, communication unit 790, or control unit 710.

The coil assembly 760 includes at least one primary coil generating a magnetic field, which may also be called a coil cell.

The impedance matching circuit 770 may provide impedance matching between the inverter and primary coil(s). The impedance matching circuit 770 may generate resonance at a suitable frequency for boosting a primary coil current. The impedance matching circuit of a multi-coil power transmitting unit 740 may further include a multiplexing element which routes a signal to a subset of primary coils of the inverter. The impedance matching circuit may also be called a tank circuit.

The impedance matching circuit 770 may include capacitor, inductor, and switching element which switches a connection thereof. Impedance matching may be performed by detecting a reflective wave of wireless power transmitted through the coil assembly 760, adjusting the connection state of capacitor or inductor by switching the switching element based on the detected reflective wave, adjusting capacitance of the capacitor, or adjusting inductance of the inductor. Depending on the situations, the impedance matching circuit 770 may be omitted, and the present specification includes embodiments of the wireless power transmitter 700 from which the impedance matching circuit 770 is omitted.

The inverter 780 may convert a DC input to an AC signal. The inverter 780 may use a half-bridge or full-bridge to generate a pulse wave and duty cycle of an adjustable frequency. Also, the inverter may include a plurality of stages to adjust an input voltage level.

The communication unit 790 may perform communication with a power receiver.

The power receiver performs load modulation to communication a request and information about a power transmitter and information. Therefore, the power transmitter 740 may monitor a current and/or voltage amplitude and/or phase of the primary coil to demodulate the data transmitted by the power receiver by using the communication unit 790.

Also, the power transmitter 740 may also control output power to transmit data by using a frequency shift keying method through a communication unit 790.

The control unit 710 may control communication and power transfer of the power transmitter 740. The control unit 710 may control power transfer by adjusting the aforementioned operating point. The operating point may be determined by at least one of an operating frequency, duty cycle, and input voltage, for example.

The communication unit 790 and control unit 710 may be implemented as a separate unit/element/chipset or as a single unit/element/chipset.

Figure 8:
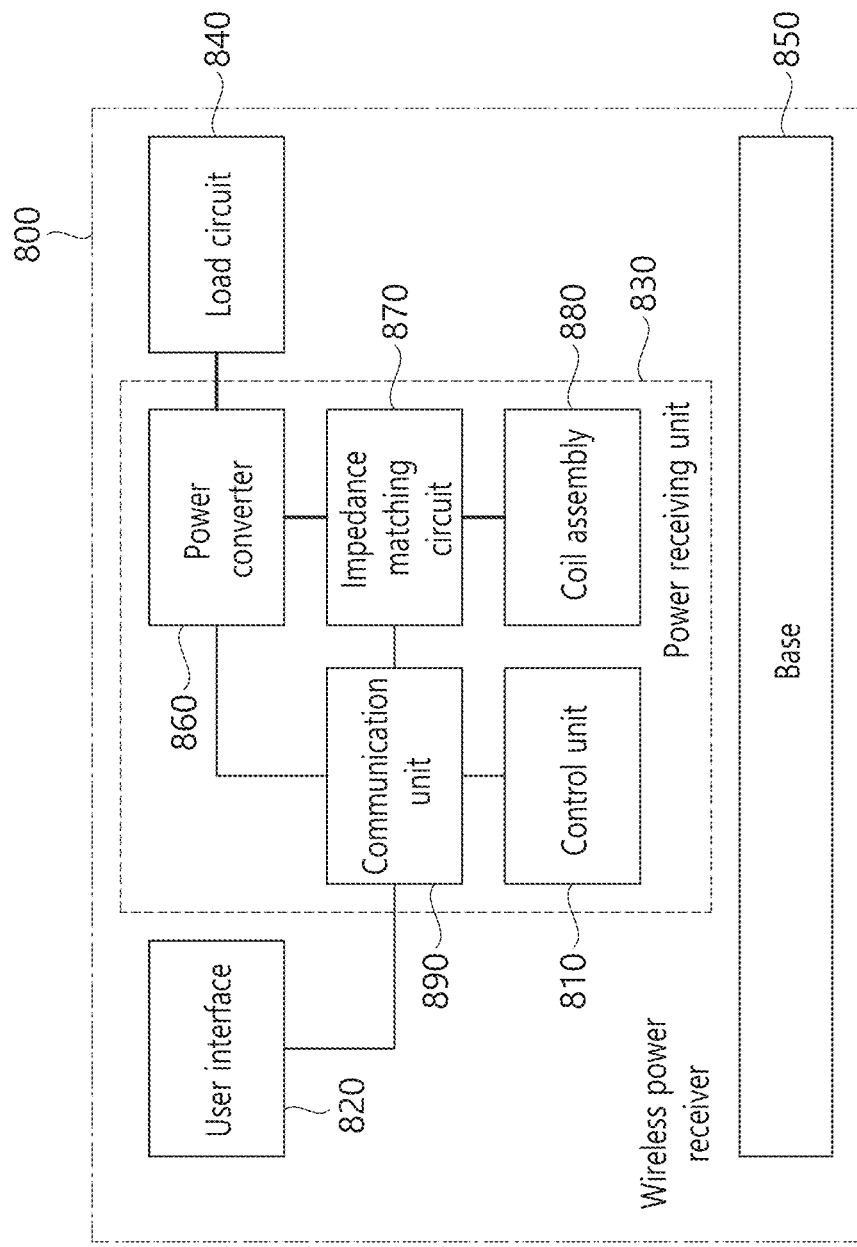
FIG. 8 illustrates a wireless power receiver according to another embodiment of the present invention.

FIG. 8 illustrates a wireless power receiver according to another embodiment of the present invention. The wireless power receiver may belong to a wireless power transfer system in a magnetic resonance or shared mode.

In FIG. 8, the wireless power receiver 800 may include at least one of a user interface 820 providing information about progress of power transfer and other matters, power receiving unit 830 receiving wireless power, load circuit 840, or base 850 supporting and covering a coil assembly. In particular, the user interface 750 may be included optionally or included as other user interface 750 of the wireless power transmitter 700.

The power receiving unit 830 may include at least one of a power converter 860, impedance matching circuit 870, coil assembly 880, communication unit 890, or control unit 810.

The power converter 860 may convert AC power received from the secondary coil to a voltage and current suitable for the load circuit. As an embodiment, the power converter 860 may include a rectifier. The rectifier may rectify received wireless power and convert the received power from AC to DC. The rectifier may convert the received power from AC to DC by using a diode or transistor and equalize the converted power by using capacitor and resistor. The rectifier may use a full-rectifier implemented by a bridge circuit, half-rectifier, voltage multiplier, and so on. In addition, the power converter may adapt reflected impedance of the power receiver.

The impedance matching circuit 870 may provide impedance matching between a combination of the power converter 860 and load circuit 870; and the secondary coil. As an embodiment, the impedance matching circuit may generate resonance at around 100 kHz which may reinforce power transfer. The impedance matching circuit 870 may include capacitor, inductor, and switching element which switches a connection thereof. Impedance matching may be performed by controlling a switching element of the impedance matching circuit 870 based on a voltage, current, power, and frequency value of received wireless power. Depending on the situations, the impedance matching circuit 870 may be omitted, and the present specification includes embodiments of the wireless power receiver 200 from which the impedance matching circuit 870 is omitted.

The coil assembly 880 includes at least one secondary coil and may further include an optional element which shields a metallic portion of the receiver from a magnetic field.

The communication unit 890 may perform load modulation to communicate a request and other information to the power transmitter.

To this purpose, the power receiving unit 830 may switch resistor or capacitor to change reflective impedance.

The control unit 810 may control received power. To this purpose, the control unit 810 may determine/calculate a difference between an actual operating point and desired operating point of the power receiving unit 830. And the control unit 810 may adjust/reduce a difference between the actual operating point and desired operating point by fulfilling a request for adjusting reflective impedance and/or an operating point of the power transmitter. When the difference is minimized, optimal power reception may be performed.

The communication unit 790 and control unit 810 may be implemented as a separate unit/element/chipset or as a single unit/element/chipset.

Figure 9:
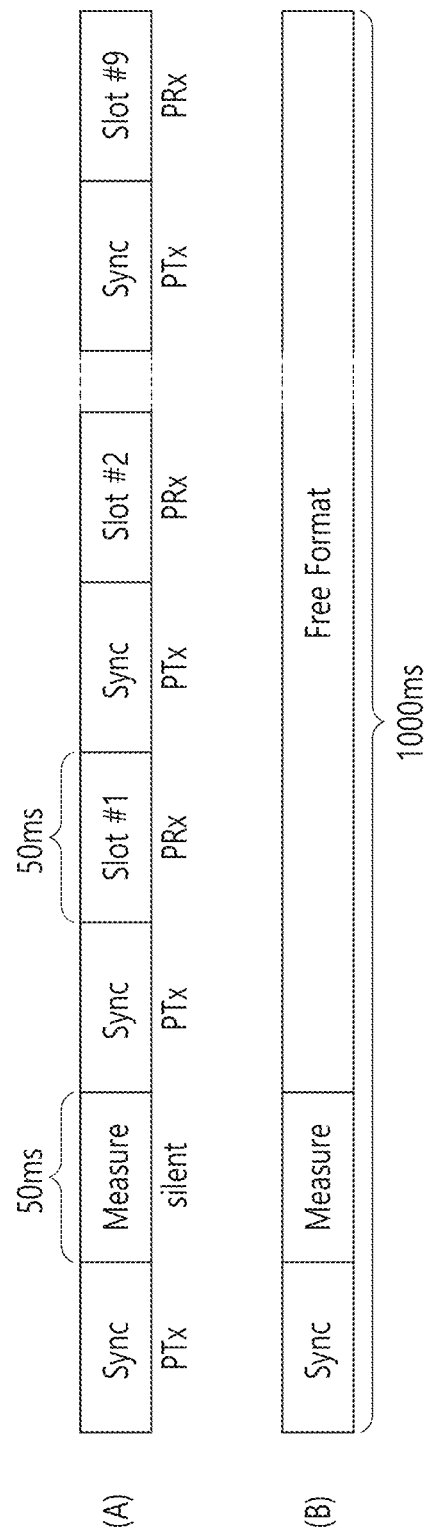
FIG. 9 illustrates a communication frame structure according to one embodiment of the present invention.

FIG. 9 illustrates a communication frame structure according to one embodiment of the present invention. The communication frame structure may be in the shared mode.

Referring to FIG. 9, in the shared mode, different forms of frames may be used together. For example, in the shared mode, a slotted frame having multiple slots as shown in (A) and a free format frame which does not have a specific form as shown in (B) may be used. More specifically, a slotted frame is aimed for transmitting short data packets from a wireless power receiver 200 to a wireless power transmitter 100, and a free format frame is capable of transmitting long data packets since multiple slots are not used.

Meanwhile, a slotted frame and free format frame may be changed to various names by those skilled in the art. For example, the slotted may be called a channel frame, and the free format frame may be called a message frame.

More specifically, the slotted frame may include a sync pattern indicating the start of a slot, measurement slot, 9 slots, and an additional sync pattern having the same time interval before each of the 9 slots.

At this time, the additional sync pattern is a sync pattern different from the one indicating the start of a frame described above. More specifically, the additional sync pattern may show information related to adjacent slots (namely two consecutive slots located at both sides of a sync pattern) without showing the start of a frame.

Among the 9 slots, a sync pattern may be placed between two consecutive slots. In this case, the sync pattern may provide information related to the two consecutive slots.

Also, the 9 slots and sync patterns provided before the respective 9 slots may have the same time interval. For example, the 9 slots may have a time interval of 50 ms. Also, the 9 sync patterns may also have time duration of 50 ms.

Meanwhile, the free format frame as shown in (B) may not have a specific form except for a sync pattern indicating the start of a frame and a measurement slot. In other words, the free format frame is aimed to perform the role different from the slot frame and may be used to perform communication of long data packets (for example, additional owner information packets) between the wireless power transmitter and wireless power receiver or perform selecting one coil from among a plurality of coils in a wireless power transmitter composed of a plurality of coils.

In what follows, the sync pattern included in each frame will be described in more detail with reference to appended drawings.

FIG. 10 illustrates a structure of a sync pattern according to one embodiment of the present invention.

Referring to FIG. 10, a sync pattern may comprise a preamble, start bit, response field, type field, info field, and parity bit. In FIG. 10, a start bit is denoted as ZERO.

More specifically, a preamble is composed of consecutive bits which may all be set to 0. In other words, a preamble may be composed of bit for setting time duration of a sync pattern.

The number of bits comprising a preamble may depend on an operating frequency so that the length of a sync pattern is close to 50 ms as much as possible but not exceeding 50 ms. For example, when the operating frequency is 100 kHz, the sync pattern may be composed of two preamble bits while, when the operating frequency is 105 kHz, the sync pattern may be composed of three preamble bits.

The start bit follows next to the preamble and may indicate ZERO. The ZERO may be a bit indicating the type of the sync pattern. Here, the type of sync pattern may include a frame sync including information related to a frame and a slot sync including information of a slot. In other words, the sync pattern may be a frame sync being located between consecutive frames and representing the start of a frame or a slot sync being located between consecutive slots among a plurality of slots constituting a frame and including information related to the consecutive slots.

For example, when the ZERO is 0, it may indicate that the corresponding slot is a slot sync located between slots while, when the ZERO is 1, it may indicate that the corresponding sync pattern is a frame sync located between frames.

The parity bit is the last bit of a sync pattern, which may represent the number of bits constituting data fields (in other words, a response field, type field, and information field) of the sync pattern. For example, the parity bit may be 1 when the number of bits constituting the data fields of a sync pattern is an even number and 0, otherwise (namely when the number of bits is an odd number).

The response field may include response information of a wireless power transmitter with respect to communication with a wireless power receiver within a slot before the sync pattern. For example, the response field may have a value of '00' if no activity of communication with a wireless power receiver is detected. Also, if a communication error is detected during communication with a wireless power receiver, the response field may have a value of '01'. The communication error may be generated when two or more wireless power receivers attempt to access one slot, and a collision is occurred among two or more wireless power receivers.

Also, the response field may include information indicating whether a data packet has been received correctly from a wireless power receiver. More specifically, if a wireless power transmitter denies a data packet, the response field may have a value of "10" (10-not acknowledge, NAK) while, if the wireless power transmitter confirms the data packet, the response field may have a value of "11" (11-acknowledge, ACK).

The type field may represent the type of a sync pattern. More specifically, the type field may have a value of '1' indicating a frame sync when a sync pattern is the first sync pattern of a frame (in other words, when the sync pattern is the first sync pattern of a frame and located before a measurement slot).

Also, when a sync pattern is not the first sync pattern of a frame, the type field may have a value of '0' indicating a slot sync.

Also, the information field may be interpreted differently according to the type of a sync pattern indicated by the type field. For example, when the type field is 1 (namely, the type field indicates a frame sync), the information field may indicate the type of a frame. In other words, the information field may represent whether a current frame is a slotted frame or free-format frame. For example, if the information field is '00', it indicates a slotted frame while, if the information field is '01', it indicates a free-format frame.

Differently from the description above, if the type field is 0 (namely in the case of a slot sync), the information field may represent the state of the next slot located after the sync pattern. More specifically, the information field may have a value of '00' when the next slot is a slot allocated to a specific wireless power receiver; '01' when the next slot is a slot locked temporarily to be used by the wireless power receiver; and '10' when the next slot is a slot which may be used freely by an arbitrary wireless power receiver.

Figure 11:
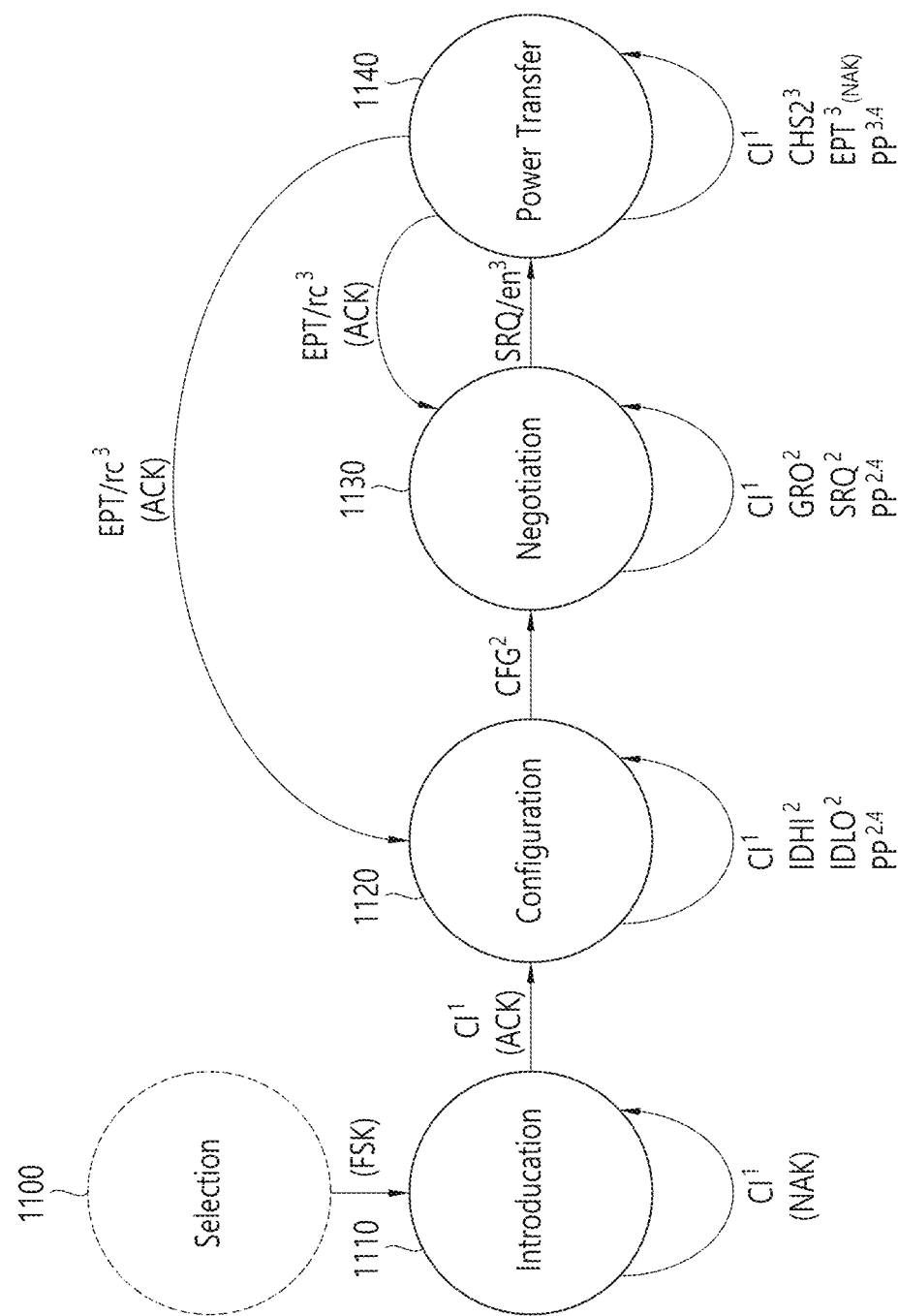
FIG. 11 illustrates operation states of a wireless power transmitter and wireless power receiver in a shared mode according to one embodiment of the present invention.

FIG. 11 illustrates operation states of a wireless power transmitter and wireless power receiver in a shared mode according to one embodiment of the present invention.

Referring to FIG. 11, a wireless power receiver operating in the shared mode may operate in one of the phases among selection phase 1100, introduction phase 1110, configuration phase 1120, negotiation phase 1130, and power transfer phase 1140.

First, a wireless power transmitter according to one embodiment of the present invention may transmit a wireless power signal to detect a wireless power receiver. In other words, a process for detecting a wireless power receiver by using a wireless power signal may be called analog ping.

Meanwhile, the wireless power receiver which has received a wireless power signal may enter the selection phase 1100. The wireless power receiver which has entered the selection state 1100, as described above, may detect existence of an FSK signal on the wireless power signal.

In other words, the wireless power receiver may perform communication according to the exclusive or shared mode depending on existence of an FSK signal.

More specifically, the wireless power receiver operates in the shared mode if an FSK signal is included in a wireless power signal or otherwise operates in the exclusive mode.

When the wireless power receiver operates in the shared mode, the wireless power receiver may enter the introduction phase 1110. In the introduction phase 1110, the wireless power receiver may transmit a control information packet to the wireless power transmitter to transmit a control information (CI) packet in the configuration, negotiation, and power transfer phases. The control information packet may have a header and control-related information. For example, the control information packet may have a header the value of which is 0X53.

In the introduction phase 1110, the wireless power receiver performs an attempt for requesting a free slot to transmit the control information (CI) packet throughout the subsequent configuration, negotiation, and power transfer phases. At this time, the wireless power receiver selects a free slot and transmits an initial CI packet. If the wireless power transmitter responds with an ACK to the corresponding CI packet, the wireless power transmitter enters the configuration phase. If the wireless power transmitter responds with a NACK, it indicates that the wireless power transmitter is performing the configuration and negotiation phases in conjunction with other wireless power receiver. In this case, the wireless power receiver re-attempts the request for a free slot.

If the wireless power receiver receives an ACK in response to the CI packet, the wireless power receiver determines the position of a private slot within a frame by counting the remaining slot syncs up to the initial frame sync. For all of the subsequent slot-based frames, the wireless power receiver transmits the CI packet through the corresponding slot.

If the wireless power transmitter allows the wireless power receiver to enter the configuration phase, the wireless power transmitter provides a series of locked slots for an exclusive use of the wireless power receiver. By doing so, the wireless power receiver may be ensured to enter the configuration phase without a collision.

The wireless power receiver transmits sequences of data packets such as two identification data packets (IDHI and IDLO) by using a locked slot. Once the present phase is completed, the wireless power receiver enters the negotiation phase. In the negotiation phase, the wireless power transmitter still provides a locked slot for an exclusive use of the wireless power receiver. This ensures that the wireless power receiver performs the negotiation phase without a collision.

The wireless power receiver transmits one or more negotiation data packets by using the corresponding locked slot, which may be mixed with private data packets. As a result, the corresponding sequence is terminated along with a specific request (SRQ) packet. If the corresponding sequence is completed, the wireless power receiver enters the power transfer phase and stops providing a locked slot.

In the power transfer phase, the wireless power receiver performs transmission of a CI packet and receives power by using an allocated slot. The wireless power receiver may include a regulator circuit. The regulator circuit may be included in the communication & control unit. The wireless power receiver may self-regulate the reflective impedance of the wireless power receiver through the regulator circuit. In other words, the wireless power receiver may adjust the reflective impedance to transmit as much power as required by an external load. By doing so, reception of excessive power and overheating may be prevented.

In the shared mode, the wireless power transmitter may not perform adjusting power in response to a received CI packet (depending on the operation mode); in this case, control may be needed to prevent an overvoltage condition.

In what follows, an apparatus and method for performing detection of a foreign object in a wireless power transfer system and a method for testing foreign object detection performance of a wireless power receiver will be disclosed.

Detection of a foreign object may be performed in various ways. A wireless power transmitter and/or receiver may perform foreign object detection during the power transfer phase or perform foreign object detection before the power transfer phase. In particular, in the case of an extended power profile (EPP) which requires relatively large power consumption or a wireless power receiver at medium power level, a function of detecting a foreign object even before the power transfer phase is needed. In other words, foreign object detection may be performed in the negotiation phase which precedes the power transfer phase. For example, if a wireless power receiver transmits a reference Q factor to a wireless power transmitter in the negotiation phase, the wireless power transmitter may determine whether a foreign object exists on the interface surface of the wireless power transmitter by using the reference Q factor.

However, even though there actually exists a foreign object, if the wireless power transmitter wrongly concludes that there is no foreign object even in the negotiation phase, the wireless power transmitter enters the power transfer phase, and system calibration is performed. Afterwards, the wireless power transmitter transmits wireless power continuously to the wireless power receiver based on the wrong decision on the foreign object detection, which may eventually lead to an accident such as overheating. As described above, a failure of proper detection of a foreign object may be caused by a difference in the individual characteristics of wireless power receivers. For example, in the case of a wireless power receiver the reference Q factor of which is low-as one example, a specific wireless power receiver may have a low Q factor depending on its type, use, and characteristics, existence of a foreign object may not be readily determined since there is not a noticeable difference between a Q factor measured in the presence of a foreign object and the reference Q factor.

As an example of a wireless power receiver, Table 3 shows reference Q factors of various mobile devices (Q factors when there is no foreign object in the surroundings) and a measurement result of Q factors of reference wireless power transmitters or test power transmitters (TPTs) when there exist predefined, various types of representative foreign objects (RFOs).

TABLE 3

| Mobile device | Q-factor measured by LCR meter | | | | |
|---|---|---|---|---|---|
| | without FO | RFO#1 | RFO#2 | RFO#3 | RFO#4 |
| None | 160 | 49.5 | 37.1 | 31 | 50 |
| A | 55 | 23.7 | 24.2 | 20 | 29 |
| B | 47 | 24.2 | 25.8 | 20.1 | 29 |
| C | 46 | 24.8 | 25 | 20 | 31 |
| D | 54 | 25.7 | 25.9 | 21.1 | 32 |
| E | 60 | 33.8 | 31.8 | 26.9 | 39.5 |
| F | 57 | 26.2 | 26.9 | 21.8 | 31 |
| G | 80 | 36 | 32.8 | 27.3 | 40.6 |
| H | 66 | 32.3 | 30 | 25.5 | 36.5 |
| I | 106 | 33.6 | 29.1 | 24.6 | 36 |
| J | 56 | 24.5 | 22.6 | 19.3 | 27.5 |
| K | 29 | 21.6 | 23.8 | 19.4 | 29 |
| L | 20 | 20.7 | 22.9 | 18.9 | 24 |
| M | 25 | 31.9 | 32.2 | 29.1 | 33 |

Referring to Table 3, when there is no mobile device (None), it is measured that the Q factor when there is no foreign object (without FO in the table) is 160; the Q factor when there exists a first representative foreign object (RFO #1) is 49.5; the Q factor when there exists a second representative foreign object (RFO #2) is 37.1; the Q factor when there exists a third representative foreign object (RFO #3) is 31; and the Q factor when there exists a fourth representative foreign object (RFO #4) is 50.

Meanwhile, in the case of mobile device "K", "L", and "M", it is observed that the Q factor is larger than or equal to the Q factor ($Q_{RFO\#n}$) in the presence of a representative foreign object, compared with the Q factor ($Q_{w/o\ FO}$) in the absence of a foreign object. Here, the representative foreign object may be an object specified for a compliance test by the WPC standard.

As described above, when there is no noticeable difference between a Q factor measured in the presence of a foreign object and a reference Q factor measured in the absence of foreign object, it may be difficult to determine existence of a foreign object. In this case, existence of a foreign object has to be determined by taking into account another determination factor or by using another method. Therefore, an apparatus and method for improving accuracy and reliability of detecting a foreign object irrespective of individual characteristics of a wireless power receiver is needed.

In what follows, a result of an experiment and simulation conducted to design an optimal reference Q factor according to the present embodiment will be disclosed. The optimal reference Q factor refers to the minimum reference Q factor by which a foreign object may be detected independently of the type and characteristics of a mobile device and/or a foreign object.

To design an optimal reference Q factor according to the present embodiment, four Q factors have been measured in advance. One is a reference Q factor ($Q_{ref}$) that may be obtained from a reference wireless power transmitter when neither a foreign object nor a wireless power receiver exists in the surroundings. Another one is a reference Q factor ($Q_{RFO}$) that may be obtained from a reference wireless transmitter when a wireless power receiver does not exist, but a representative foreign object is present in the surroundings. Third one is related to the case where a wireless power receiver is place on a reference wireless power transmitter and corresponds to a first Q factor ($Q_{RX}$) which is a reference Q factor that may be obtained from a reference wireless power transmitter when no representative foreign object exists in the surroundings. The last one is related to the case where a wireless power receiver is placed on a reference wireless power transmitter and corresponds to a second Q factor ($Q_{RX+RFO}$) which is a reference Q factor that may be obtained from a reference wireless power transmitter when a representative foreign object exists in the surroundings.

First, a reference Q factor ($Q_{ref}$) that may be obtained from a reference wireless power transmitter when neither a foreign object nor a wireless power receiver exists in the surroundings is derived.

Figure 12:
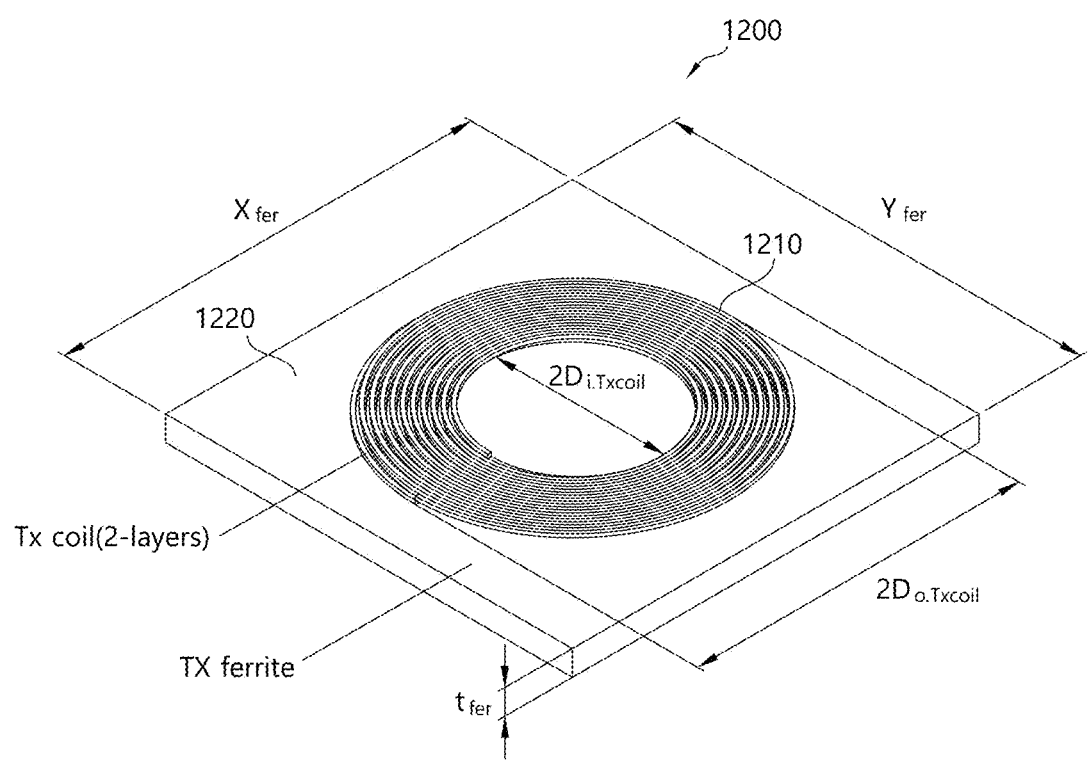
FIG. 12 is a perspective view of a primary coil and shielding unit of a reference wireless power transmitter used for an experiment of the present embodiment.

FIG. 12 is a perspective view of a primary coil and shielding unit of a reference wireless power transmitter used for an experiment of the present embodiment.

Referring to FIG. 12, the power transmitting unit 1200 of a reference wireless power transmitter includes a primary coil 1210 and shielding unit 1220.

The primary coil 1210 is wound in a planar spiral pattern and may be disposed on one surface of the shielding unit 1220. A litz coil may be used as the primary coil 1210. The primary coil 1210 and shielding unit 1220 model TPT-QFACTOR, and each physical parameter value follows the physical parameter value related to the TPT-QFACTOR defined in the WPC standard ver1.2.3.

When an input signal having a frequency of 100 kHz is applied to the power transmitting unit 1200 having the aforementioned physical parameter value, measured inductance ($L_{REF}$) and reference Q factor ($Q_{ref}$) are given as shown in Table 4.

TABLE 4

| Symbol | Standard | Measurement result | Simulation result |
|---|---|---|---|
| $L_{REF}$ (μH) | 124.8 ± 1 | — | 25.8 |
| $Q_{ref}$ | 157.6 ± 2%~158.6 ± 2% | 160 | 158.3 |

It may be known from Table 4 that the reference Q factor that may be obtained from a reference wireless power transmitter is 160.

Next, when there exists no wireless power receiver, but a representative foreign object exists in the surroundings, a reference Q factor ($Q_{ref}$) that may be obtained from the reference wireless power transmitter is derived.

FIG. 13 is a perspective view of a primary coil and shielding unit of a reference wireless power transmitter; and four representative foreign objects used for an experiment of the present embodiment.

Referring to FIG. 13, the representative foreign object (RFO #1) used in the experiment (a) is a disk type steel having a diameter of 15 mm and a thickness of 1 mm; the representative foreign object (RFO #2) used in the experiment (b) is a ring type aluminum having an outer diameter of 22 mm, inner radius of 20 mm, and the maximum outer diameter of 26 mm; the representative foreign object (RFO #3) used in the experiment (c) is foil aluminum having a diameter of 20 mm and a thickness of 0.1 mm; the representative foreign object (RFO #4) used in the experiment (d) is a disk type aluminum having a radius of 22 mm and a thickness of 1 mm. As shown in the lower part of (a), (b), (c), and (d), the Q factor is measured while the center of each representative foreign object is made to be aligned with the center of a reference wireless power transmitter 1200, and a vertical spacing between the two centers is kept to 2.5 mm+0.5 mm. Here, 2.5 mm is a distance from the upper end of the primary coil to the interface surface of the reference wireless power transmitter, and 0.5 mm is a distance from the representative foreign object to the lower end of the frame.

Table 5 shows a reference Q factor ($Q_{RFO}$) measured when an input signal having a frequency of 100 kHz is applied to each representative foreign object.

TABLE 5

| Reference Q factor ($Q_{RFO}$) | Measurement result | Simulation result |
|---|---|---|
| RFO#1 | 49.5 | 49.5 |
| RFO#2 | 37.1 | 34.4 |
| RFO#3 | 31 | 27.1 |
| RFO#4 | 50 | 51 |

Considered next is the case when a wireless power receiver is placed on a reference wireless power transmitter; a first Q factor ($Q_{RX}$) which is a reference Q factor that may be obtained from the reference wireless power transmitter is derived under a condition that no representative foreign object is present in the surroundings thereof.

Figure 14:
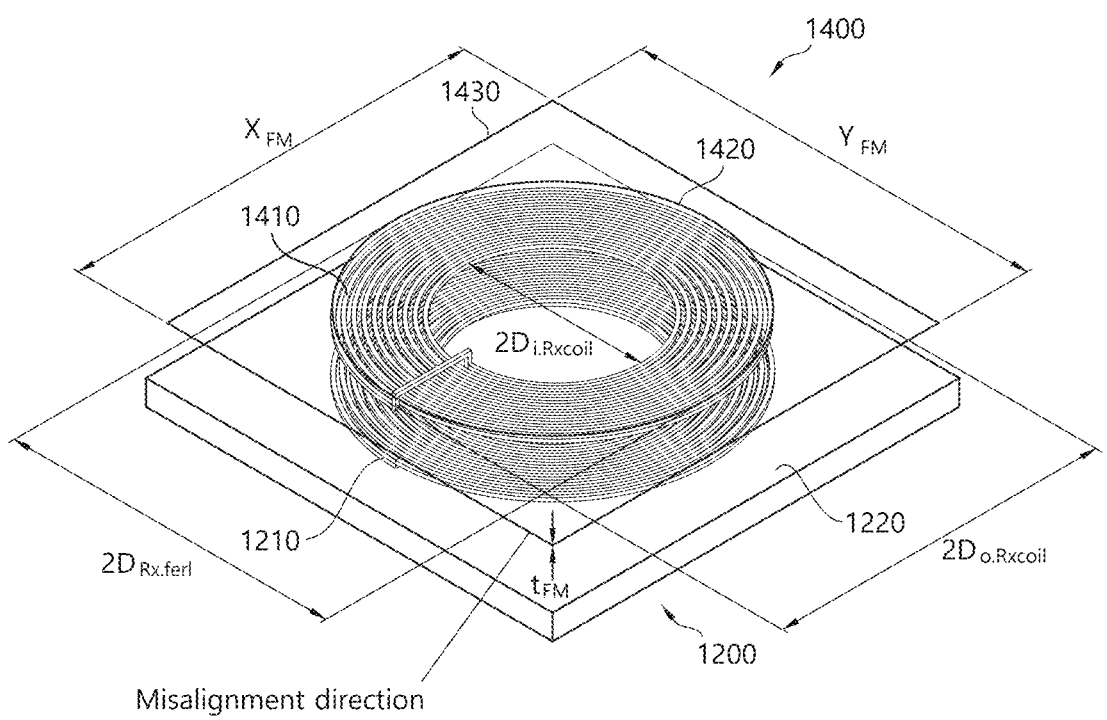
FIG. 14 is a perspective view of a primary coil and shielding unit of a reference wireless power transmitter; and a secondary coil, shielding unit, and metal case member of a reference wireless power receiver used for an experiment of the present embodiment.

FIG. 14 is a perspective view of a primary coil and shielding unit of a reference wireless power transmitter; and a secondary coil, shielding unit, and metal case member of a reference wireless power receiver used for an experiment of the present embodiment.

Referring to FIG. 14, the power transmitting unit 1200 of the reference wireless power transmitter includes a primary coil 1210 and shielding unit 1220, which is the same as shown in FIG. 12.

The power receiving unit 1400 of the reference wireless power receiver includes a secondary coil 1410, shielding unit 1420, and metal case member 1430 of a mobile device.

The secondary coil 1410 is wound in a planar spiral pattern and may be disposed on one surface of the shielding unit 1420. A litz coil may be used as the secondary coil 1410. The secondary coil and shielding unit used in the experiment of the present invention is iPhone X. Also, the horizontal and vertical length of the metal case member 1430 are 50 mm, respectively.

Figure 15:
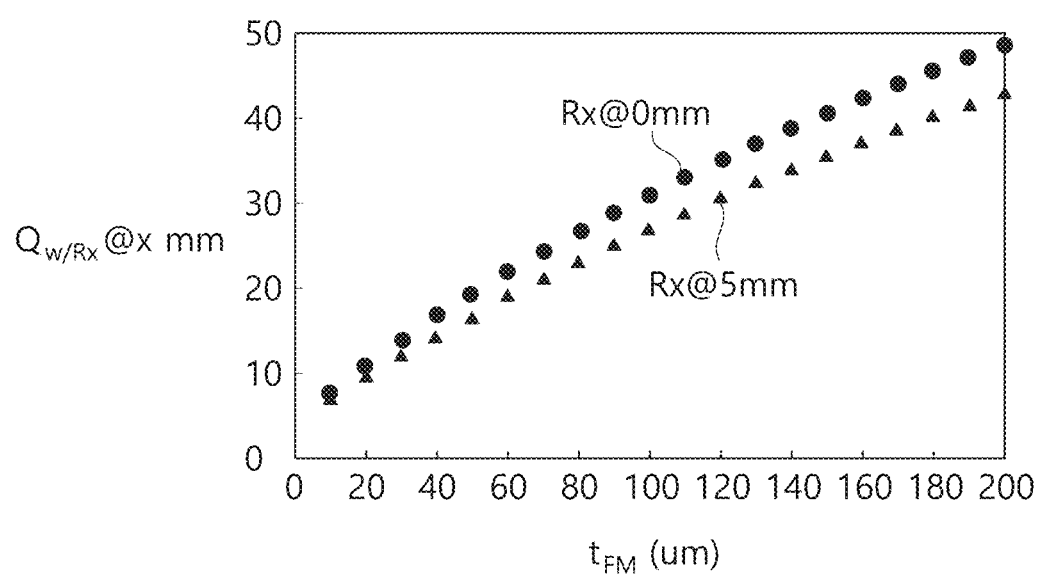
FIG. 15 illustrates a simulation result according to the embodiment of FIG. 14.

FIG. 15 shows a first Q factor ($Q_{RX}$) measured when the thickness ($t_{FM}$) of the metal case is varied while an input signal with a frequency of 100 kHz is applied to the power transmitting unit 1200 having the aforementioned physical parameter values. FIG. 15 is a simulation result according to an embodiment of FIG. 14.

Referring to FIG. 15, "@xmm" indicates that the center of the secondary coil of the wireless power receiver is separated from the center of the reference wireless power transmitter by x mm. The reference Q factor may be defined as the smallest value among the total of five Q factors measured by placing the wireless power receiver so that the center thereof is aligned with the center of the reference wireless power transmitter, and a vertical spacing between the centers is kept to 5 mm; and rotating the wireless power receiver sequentially by 0°, 90°, 180°, and 270°.

As may be seen from the result of FIG. 15, the Q factor ($Q_{Rx\ @0mm}$) measured at the center of the reference wireless power transmitter is different from the Q factor ($Q_{Rx\ @5mm}$) measured at the position separated by 5 mm from the center. Meanwhile, it may be seen that when the thickness of a metal case is increased, both of $Q_{Rx\ @0mm}$ and $Q_{Rx\ @5mm}$ are increased.

Considered next is the case where the wireless power receiver is placed on the reference wireless power transmitter; a second Q factor ($Q_{RX\_RFO}$) which is a reference Q factor that may be obtained from the reference wireless power transmitter is derived under a condition that a representative foreign object is present in the surroundings thereof.

FIG. 16 is a perspective view of a primary coil and shielding unit of a reference wireless power transmitter; a secondary coil, shielding unit, and metal case member of a reference wireless power receiver; and representative foreign objects used for an experiment of the present embodiment.

The power transmitting unit of a reference wireless power transmitter and a reference wireless power receiver used in the experiment and simulation of FIG. 16 are the same as the power transmitting unit 1200 of FIG. 12 and the wireless power receiver of FIG. 14; and foreign objects used in the experiments (a), (b), (c), and (d) are the same as the representative foreign object of FIG. 13, respectively. When a simulation is performed under the condition of FIG. 16, a result as shown in FIGS. 17a to 17d may be obtained.

FIGS. 17a to 17d illustrate a simulation result performed in the environment of FIG. 16 according to the present embodiment.

Figure 17A:
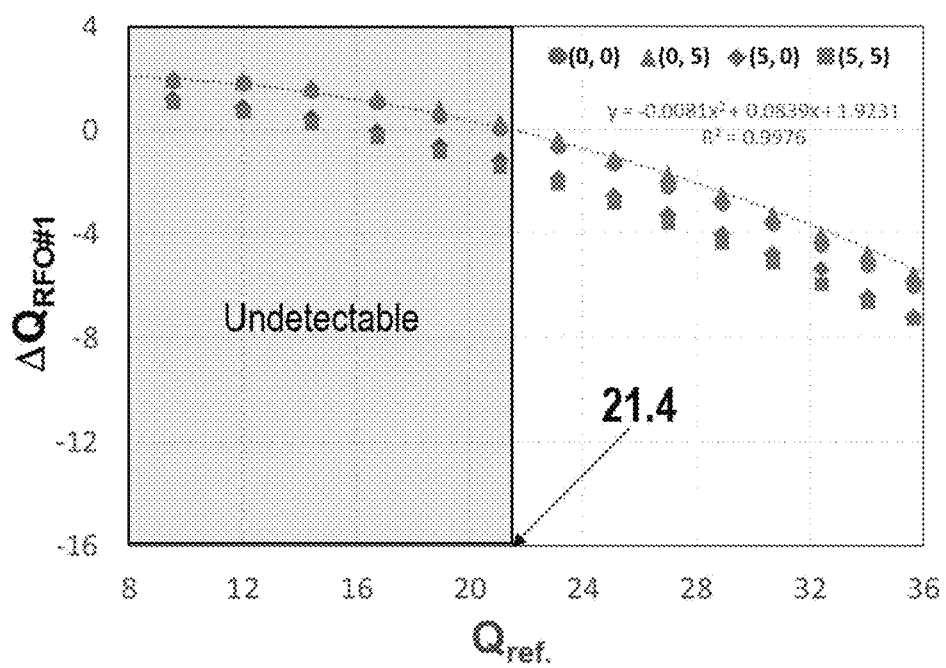
FIGS. 17a to 17d illustrate a simulation result performed in the environment of FIG. 16 according to the present embodiment.
Figure 17B:
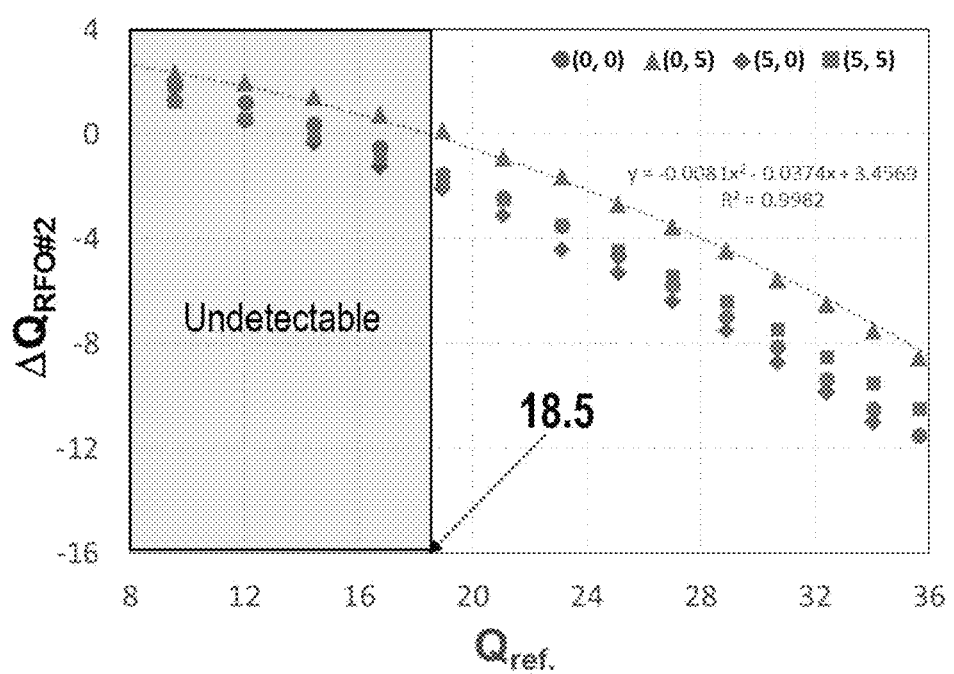
Figure 17C:
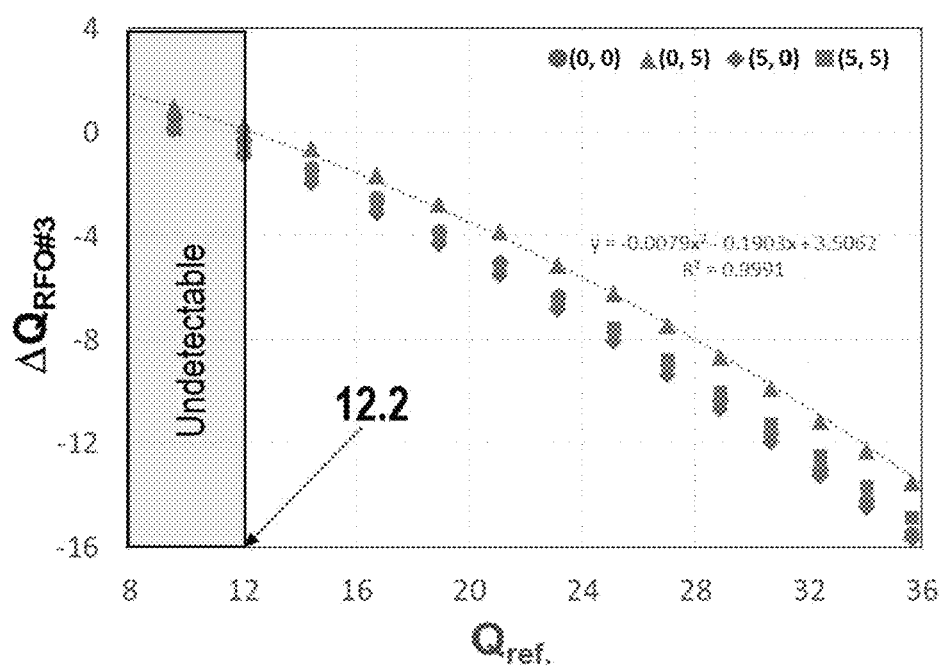
Figure 17D:
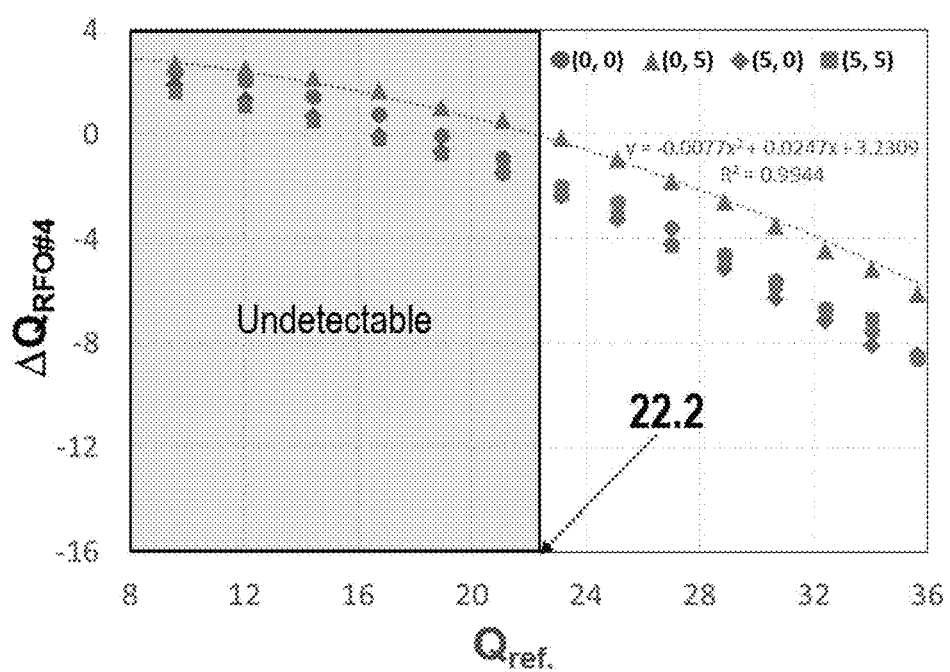

FIG. 17a is a simulation result in the environment of FIG. 16(a), FIG. 17b in the environment of FIG. 16(b), FIG. 17c in the environment of FIG. 16(c), and FIG. 17d in the environment of FIG. 16(d).

A foreign object degrades a Q factor. Therefore, a Q factor measured in the presence of a foreign object is usually smaller than a reference Q factor in the absence of a foreign object. Therefore, when a method for detecting a foreign object based on a Q factor is used, it is determined that a foreign object exists when a measured Q factor is smaller than a reference Q factor. However, if a measured Q factor is equal to or even greater than a reference Q factor in spite of the presence of a foreign object, it may be erroneously judged that a foreign object does not exist. In other words, despite the general observation that when a foreign object is inserted, the Q factor becomes smaller than a reference Q factor in the absence of a foreign object due to the loss caused by the foreign object, if a measured Q factor becomes even greater than or equal to the reference Q factor (namely the amount of change 0), the foreign object may not be detected.

Therefore, an optimal reference Q factor is designed by using a method which sets a reference Q factor (first Q factor) obtained when an arbitrary wireless power receiver is placed on a reference wireless power transmitter in the absence of a foreign object as a variable and monitors how much a second Q factor measured in the presence of a representative foreign object is changed from the first Q factor In the respective graphs of FIGS. 17a to 17d, x-axis represents a Q factor ($Q_{ref}$) or a first Q factor ($Q_{RX}$) that a wireless power receiver reports to a reference wireless power transmitter; and y-axis represents the amount of change in the Q factor ($\Delta Q_{RFO}$) which describes how the specific reference Q factor ($Q_{ref}$) increases or decreases due to a representative foreign object. Here, the amount of change ($\Delta Q_{RFO}$) in the Q factor may be expressed by the following equation.

$$\Delta Q_{RFO} = Q_{RX+RFD} - Q_{ref} \qquad [\text{Eq. 1}]$$

Referring to Eq. 1, $Q_{RX+RFO}$ is a measured, second Q factor, and $Q_{ref}$ is a first Q factor reported to a reference wireless transmitter.

In a section of x-axis where the second Q factor ($Q_{RX+RFO}$) measured when a representative foreign object is inserted is larger than or equal to the first Q factor ($Q_{ref}$), a foreign object is undetectable. As described above, if a section of the first Q factor in which an error may occur at the time of detecting a foreign object based on the Q factor is defined as an undetected section, the undetected section may be found from the simulation result of FIGS. 17a to 17d. In the respective graphs of FIGS. 17a to 17d, the coordinates (a, b) implies that a wireless power receiver is placed at the position offset from the center of a reference wireless power transmitter by a along the x-axis and by b along the y-axis. Furthermore, the present embodiment defines an undetected section more conservatively with respect to the coordinates (0, 5) at which a Q factor measurement error is larger.

And if the first Q factor at the boundary between an undetected section and detected section is defined as a threshold Q factor ($Q_{ref,OX}$), it has been found from the simulation result that the threshold Q factor is determined differently for each representative foreign object. In the case of FIG. 17a where a first representative foreign object (RFO #1) is used, the threshold Q factor has been found to be 21.4; in the case of FIG. 17b where a second representative foreign object (RFO #2) is used, the threshold Q factor has been found to be 18.5; in the case of FIG. 17c where a third representative foreign object (RFO #3) is used, the threshold Q factor has been found to be 12.2; and in the case of FIG. 17d where a fourth representative foreign object (RFO #4) is used, the threshold Q factor has been found to be 22.2. The threshold Q factor may also be called a first Q factor when the first and the second Q factor are the same with each other.

Wireless power receivers having a first Q factor smaller than or equal to the threshold Q factor belong to the undetected section while wireless power receivers having a first Q factor larger than the threshold Q factor belong to the detected section. In other words, if the first Q factor is smaller than or equal to the threshold Q factor ($Q_{ref} \leq Q_{ref,ox}$), a foreign object is undetectable. On the other hand, if the first Q factor is larger than the threshold Q factor ($Q_{ref} > Q_{ref,ox}$), a foreign object may be detectable.

The detected section common to all of the representative foreign objects is a section where the first Q factor is larger than the threshold Q factor (=22.2), and in a section of the first Q factor smaller than the threshold Q factor, a foreign object may or may not be detected depending on the type of the representative foreign object. Therefore, the present embodiment derives an optimal threshold Q factor at which all of foreign objects may be detected as 22.2 and designs an optimal reference Q factor based on the optimal threshold Q factor. In what follows, a method for designing an optimal reference Q factor is disclosed.

According to the WPC specification, the reference Q factor transmitted to a wireless power transmitter by a wireless power receiver has to provide accuracy at an error level of ±10%. In other words, the reference Q factor ($Q_{ref}$)

obtained at the time of designing or manufacturing a wireless power receiver has to satisfy the condition $0.9 \times Q'_{ref} \leq Q_{ref} \leq 1.1 \times Q'_{ref}$ from a relationship with a Q factor ($Q'_{ref}$) measured at the time of an actual wireless power charging service. In other words, an optimal reference Q factor ($Q_{ref\_min}$) may be derived within a range in which the aforementioned condition is satisfied. Considering an error, the minimum value of the reference Q factor ($Q_{ref}$) is allowed down to $0.9 \times Q'_{ref}$.

Therefore, if a foreign object is to be successfully detected at least for all of representative foreign objects, the optimal reference Q factor ($Q_{ref\_min}$) has only to be designed so that an error value (-10%) allowed for a measured Q factor is at least larger than the optimal threshold Q factor (namely $Q_{ref\_min} = Q'_{ref}$ where $0.9 \times Q'_{ref} > 22.2$). In this case, a design constraint where the optimal reference Q factor ($Q_{ref\_min}$) is larger than 24.666 is derived. Here, since the optimal reference Q factor is the minimum reference Q factor above which a foreign object may be detected, the optimal reference Q factor may also be called the minimum reference Q factor. In what follows, for the convenience of descriptions, the optimal reference Q factor will be called the minimum reference Q factor.

According to one embodiment, the minimum reference Q factor ($Q_{ref\_min}$) may be designed to belong to a range from 24 to 26. Following the design, if the reference Q factor of an arbitrary wireless power receiver is less than or equal to 24, the arbitrary wireless power receiver fails to pass the foreign object detection performance test.

According to another embodiment, the optimal reference Q factor ($Q_{ref\_min}$) may be designed to belong to a range from 24.66 to 25. Following the design, if the reference Q factor of an arbitrary wireless power receiver is less than or equal to 24.66, the arbitrary wireless power receiver fails to pass the foreign object detection performance test.

According to yet another embodiment, the optimal reference Q factor ($Q_{ref\_min}$) may be designed to be 24.7. Following the design, if the reference Q factor of an arbitrary wireless power receiver is less than or equal to 24.7, the arbitrary wireless power receiver fails to pass the foreign object detection performance test. On the other hand, if the reference Q factor of an arbitrary wireless power receiver exceeds 24.7, the arbitrary wireless power receiver passes the foreign object detection performance test.

According to still another embodiment, the optimal reference Q factor ($Q_{ref\_min}$) may be designed to be 25. Following the design, if the reference Q factor of an arbitrary wireless power receiver is less than or equal to 25, the arbitrary wireless power receiver fails to pass the foreign object detection performance test. On the other hand, if the reference Q factor of an arbitrary wireless power receiver exceeds 25, the arbitrary wireless power receiver passes the foreign object detection performance test.

Figure 18:
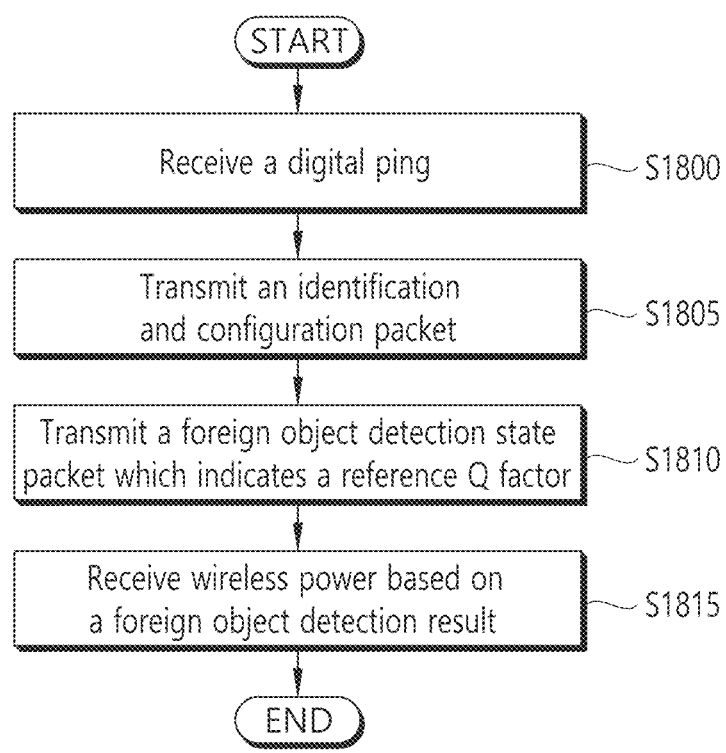
FIG. 18 illustrates a flow diagram of a method for receiving wireless power from a wireless power transmitter based on foreign object detection by a wireless power receiver according to one embodiment of the present invention.

FIG. 18 illustrates a flow diagram of a method for receiving wireless power from a wireless power transmitter based on foreign object detection by a wireless power receiver according to one embodiment of the present invention.

Referring to FIG. 18, a wireless power receiver receives digital ping from a wireless power transmitter S1800. Afterwards, the wireless power receiver transmits an identification and configuration packet to the wireless power transmitter S1805. When the identification and configuration packet is transmitted to the wireless power transmitter, the wireless power receiver and the transmitter enter the negotiation phase.

In the negotiation phase, the wireless power receiver transmits a foreign object detection state packet which indicates a reference Q factor ($Q_{ref}$) of the wireless power receiver to the wireless power transmitter S1810.

The wireless power receiver receives wireless power through magnetic coupling from the wireless power transmitter based on the foreign object detection result of the wireless power transmitter which uses the reference Q factor S1815. If it is determined that a foreign object has been detected, the wireless power transmitter does not transmit power based on an extended power profile. In other words, if a foreign object is detected, the wireless power transmitter may transmit power based on a basic power profile or stop transmission of power and enter a standby state. In this case, the wireless power receiver may or may not receive wireless power based on the basic power profile. On the other hand, if it is determined that a foreign object has not been detected, the wireless power transmitter may transmit wireless power based on the extended power profile, and the wireless power receiver may receive increased wireless power from the wireless power transmitter.

Here, the reference Q factor is a Q factor of a reference wireless power transmitter with respect to the wireless power receiver in the absence of a nearby foreign object, and the reference Q factor may be larger than or equal to the minimum reference Q factor ($Q_{ref\_min}$) required for an arbitrary wireless power receiver compatible with the reference wireless power transmitter.

As one example, provided that a first Q factor ($Q_{RX}$) of a reference wireless power transmitter with respect to the arbitrary wireless power receiver in the absence of a nearby foreign object is the same as a second Q factor ($Q_{RX,RFO}$) of the reference wireless power transmitter with respect to the arbitrary wireless power receiver in the presence of a nearby representative foreign object (RFO), if the first Q factor is denoted as a threshold Q factor ($Q_{ref,OX}$) by which the representative foreign object may be detected, the minimum Q factor value may be defined based on the threshold Q factor.

Here, the minimum reference Q factor may be defined as a value which compensates the threshold Q factor for as much as 10% which is a Q factor measurement error. In one aspect, the threshold Q factor may be a value within a range from 22 to 23, the Q factor measurement error may correspond to 10% of the threshold Q factor, and the minimum reference Q factor may be a value within a range from 24 to 26. In another aspect, the threshold Q factor may be a value within a range from 22 to 23, the Q factor measurement error may correspond to 10% of the threshold Q factor, and the minimum reference Q factor may be a value within a range from 24 to 26. In yet another aspect, the threshold Q factor may be 22.2, and the minimum reference Q factor may be a value within a range from 24.7 to 25. Also, the representative foreign object may be a fourth representative foreign object among various types of representative foreign objects, which maximizes the threshold Q factor.

As another example, when $\Delta Q$ factor=second Q factor−first Q factor, the minimum reference Q factor may be defined based on the first Q factor which satisfies $\Delta Q$ factor=0; the first Q factor may be a Q factor of a reference wireless power transmitter with respect to the arbitrary wireless power receiver in the absence of a nearby foreign object; and the second Q factor may be a Q factor of the reference wireless power transmitter with respect to the arbitrary wireless power receiver in the presence of a nearby representative foreign object.

Figure 19:
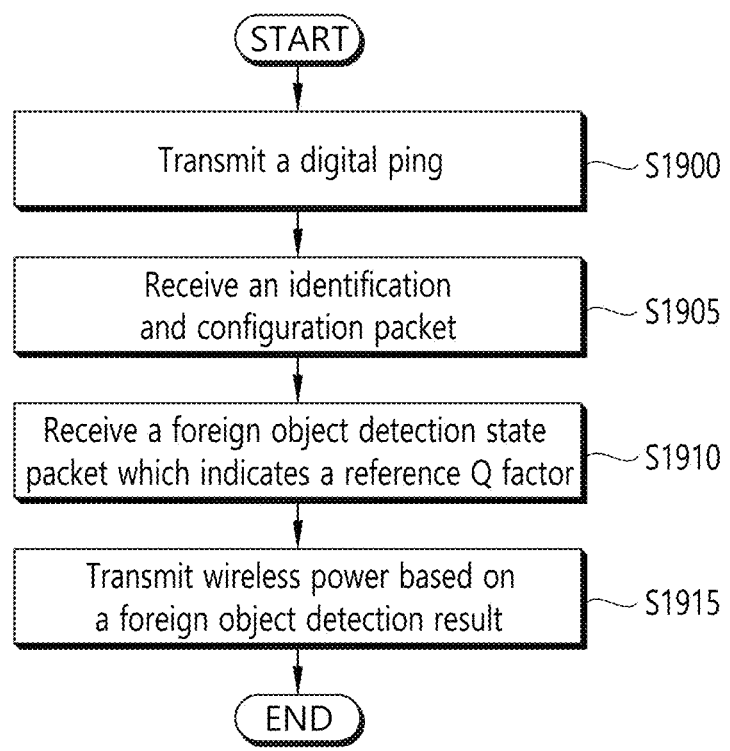
FIG. 19 illustrates a flow diagram of a method for transmitting wireless power to a wireless power receiver based on foreign object detection by a wireless power transmitter according to one embodiment of the present invention.

FIG. 19 illustrates a flow diagram of a method for transmitting wireless power to a wireless power receiver based on foreign object detection by a wireless power transmitter according to one embodiment of the present invention.

Referring to FIG. 19, a wireless power transmitter transmits digital ping to a wireless power receiver S1900.

Afterwards, the wireless power transmitter receives an identification and configuration packet from a wireless power receiver S1905. When the identification and configuration packet is received from the wireless power receiver, the wireless power receiver and the transmitter enter the negotiation phase.

In the negotiation phase, the wireless power transmitter receives a foreign object detection state packet which indicates a reference Q factor ($Q_{ref}$) of the wireless power receiver from the wireless power receiver 51910.

The wireless power transmitter transmits wireless power through magnetic coupling to the wireless power receiver based on the foreign object detection result of the wireless power transmitter which uses the reference Q factor S1915. If it is determined that a foreign object has been detected, the wireless power transmitter does not transmit power based on an extended power profile. In other words, if a foreign object is detected, the wireless power transmitter may transmit power based on a basic power profile or stop transmission of power and enter a standby state. In this case, the wireless power receiver may or may not receive wireless power based on the basic power profile. On the other hand, if it is determined that a foreign object has not been detected, the wireless power transmitter may transmit wireless power based on the extended power profile, and the wireless power receiver may receive increased wireless power from the wireless power transmitter.

Here, the reference Q factor is a Q factor of a reference wireless power transmitter with respect to the wireless power receiver in the absence of a nearby foreign object, and the reference Q factor may be larger than or equal to the minimum reference Q factor ($Q_{ref\_min}$) required for an arbitrary wireless power receiver compatible with the reference wireless power transmitter.

As one example, provided that a first Q factor ($Q_{RX}$) of a reference wireless power transmitter with respect to the arbitrary wireless power receiver in the absence of a nearby foreign object is the same as a second Q factor ($Q_{RX,RFO}$) of the reference wireless power transmitter with respect to the arbitrary wireless power receiver in the presence of a nearby representative foreign object (RFO), if the first Q factor is denoted as a threshold Q factor ($Q_{ref,OX}$) by which the representative foreign object may be detected, the minimum Q factor value may be defined based on the threshold Q factor.

Here, the minimum reference Q factor may be defined as a value which compensates the threshold Q factor for as much as 10% which is a Q factor measurement error. In one aspect, the threshold Q factor may be a value within a range from 22 to 23, the Q factor measurement error may correspond to 10% of the threshold Q factor, and the minimum reference Q factor may be a value within a range from 24 to 26. In another aspect, the threshold Q factor may be a value within a range from 22 to 23, the Q factor measurement error may correspond to 10% of the threshold Q factor, and the minimum reference Q factor may be a value within a range from 24 to 26. In yet another aspect, the threshold Q factor may be 22.2, and the minimum reference Q factor may be a value within a range from 24.7 to 25. Also, the representative foreign object may be a fourth representative foreign object among various types of representative foreign objects, which maximizes the threshold Q factor.

As another example, when ΔQ factor=second Q factor− first Q factor, the minimum reference Q factor may be defined based on the first Q factor which satisfies ΔQ factor=0; the first Q factor may be a Q factor of a reference wireless power transmitter with respect to the arbitrary wireless power receiver in the absence of a nearby foreign object; and the second Q factor may be a Q factor of the reference wireless power transmitter with respect to the arbitrary wireless power receiver in the presence of a nearby representative foreign object.

Figure 20:
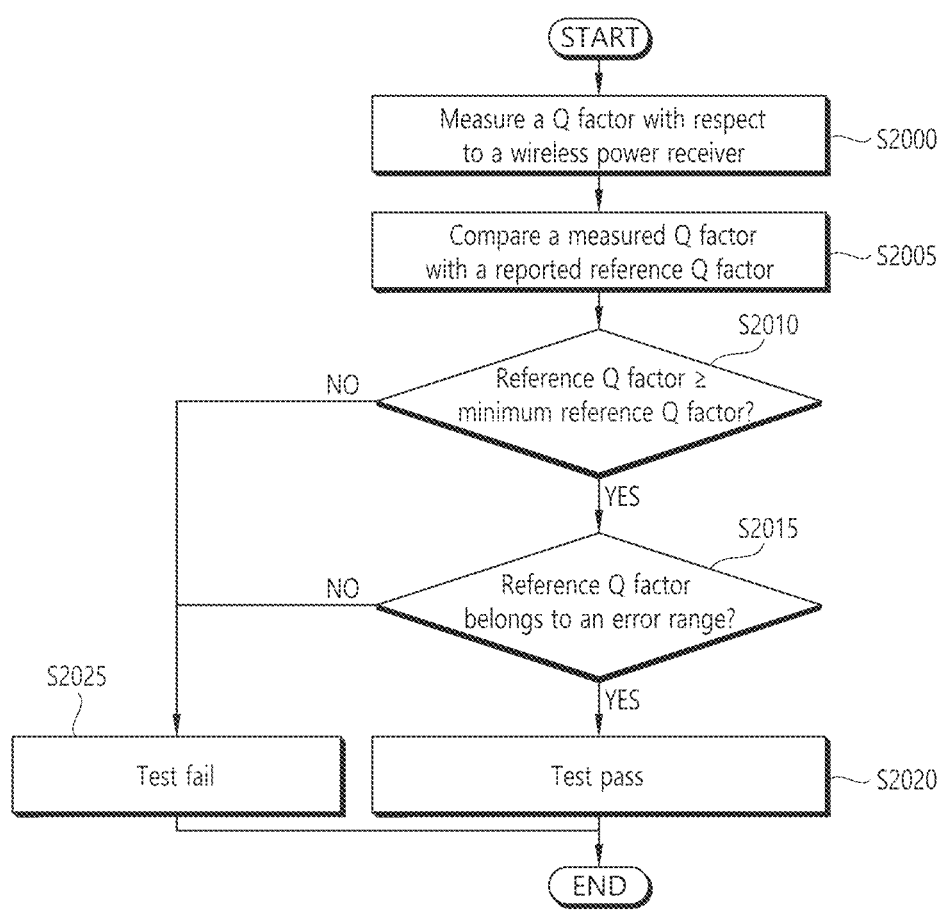
FIG. 20 illustrates a flow diagram of a method for testing foreign object detection performance of a wireless power receiver in a wireless power transfer system according to one embodiment of the present invention.

FIG. 20 illustrates a flow diagram of a method for testing foreign object detection performance of a wireless power receiver in a wireless power transfer system according to one embodiment of the present invention.

Referring to FIG. 20, a test method according to the present embodiment comprises measuring a Q factor with respect to a wireless power receiver at a predetermined test position on a reference wireless power transmitter S2000; comparing the measured Q factor with a reference Q factor reported by the wireless power receiver through an FOD state packet S2005; and if the reference Q factor is larger than or equal to the minimum reference Q factor ($Q_{ref\_min}$) required for an arbitrary wireless power receiver compatible with the reference wireless power transmitter S2010, and the measured Q factor belongs to an error range (±10%) of the reference Q factor S2015, determining a foreign object detection performance test of the wireless power receiver as being successful S2020.

Meanwhile, in the S2010 step, if the reference Q factor is smaller than the minimum reference Q factor, it is determined that the test has failed S2025. Also, if the Q factor measured in the S2015 step does not belong to the error range (10%) with respect to the reference Q factor, it is determined that the test has failed S2025.

FIG. 21 is a block diagram of an FOD state packet according to one embodiment of the present invention.

Referring to FIG. 21, an FOD state packet may be composed of two bytes (B1, B2), for example. Of the two bytes, the first byte (B1) includes an information field ($Q_{ref}><Q'_{ref}$) showing the result of comparing a reference Q factor with the minimum reference Q factor, reserved field, and mode field. The second byte (B2) includes a field indicating the reference Q factor. Although the figure illustrates that the information field ($Q_{ref}><Q'_{ref}$) is composed of two bits and positioned at the first byte, the information field may be positioned at the second byte or positioned between the reserved field and mode field or after the mode field; and even the number of bits may be 1 bit or 3 bits or more rather than 2 bits.

Meanwhile, the information field ($Q_{ref}><Q'_{ref}$) may indicate the following as shown in Table 6.

TABLE 6

| $Q_{ref}><Q'_{ref}$ | Indication |
|---|---|
| 00 | $Q_{ref}><Q'_{ref}$ |
| 01 | Reserved |
| 10 | Reserved |
| 11 | $Q_{ref}<Q'_{ref}$ |

Referring to Table 6, if the information field ($Q_{ref}><Q'_{ref}$) is 11, it indicates that a foreign object detection method based on Q factor is unreliable, and a foreign object detection method such as providing an alarm by which a user may directly check existence of a foreign object may be invoked.

Since all of the constituting elements or steps pertaining to a wireless power transmitter and method for transmitting power wirelessly or a wireless power receiver and method for receiving power wirelessly according to an embodiment of the present invention described above are not essential, the wireless power transmitter and method for transmitting power wirelessly or the wireless power receiver and method for receiving power wirelessly may be performed by using the whole or part of the constituting elements or steps. Also, embodiments of the wireless power transmitter and method for transmitting power wirelessly or the wireless power receiver and method for receiving power wirelessly may be performed in combination with each other. Also, the constituting elements or steps do not necessarily have to be performed in the order as described above, and a step which has been described later may be performed before the steps described earlier.

The description given above is merely an embodiment for illustrating technical principles of the present invention, and various changes and modifications are possible from the disclosure by those skilled in the art to which the present invention belongs without deviating from the inherent characteristics of the present invention. Therefore, the embodiments of the present invention described above may be implemented separately from each other or in the form of a combination thereof.

Therefore, it should be understood that embodiments disclosed in the present specification are not intended to limit the technical principles of the present invention but to support describing the present invention, and thus the technical scope of the present invention is not limited by the embodiments. The technical scope of the present invention should be judged by the appended claims, and all of the technical principles found within the range equivalent to the technical scope of the present invention should be interpreted to belong thereto.

Irrespective of individual characteristics of a wireless power receiver, accuracy and reliability of detecting a foreign object may be improved.

What is claimed is:

1. A method for receiving wireless power from a wireless power transmitter by a wireless power receiver based on foreign object detection in a wireless power transfer system, the method comprising:
    receiving a digital ping from the wireless power transmitter;
    transmitting a configuration packet to the wireless power transmitter;
    transmitting a foreign object detection status packet including a reference Q factor ($Q_{ref}$) of the wireless power receiver to the wireless power transmitter; and
    receiving wireless power from the wireless power transmitter based on a result of foreign object detection, wherein the foreign object detection is performed by the wireless power transmitter based on the reference Q factor,
    wherein the reference Q factor is determined based on five Q factors of a reference wireless power transmitter with respect to the wireless power receiver,
    wherein the five Q factors include a Q factor measured at the center of the reference wireless power transmitter and four Q factors measured at four different positions separated by 5 mm from the center, and
    wherein the reference Q factor is larger than or equal to 25.

2. The method of claim 1, wherein the reference Q factor is larger than or equal to 25 which is a minimum Q factor value,
    wherein a first Q factor ($Q_{RX}$) is a property of a reference wireless power transmitter with respect to the arbitrary wireless power receiver in the absence of a nearby foreign object, and a second Q factor ($Q_{RX,RFO}$) is a property of the reference wireless power transmitter with respect to the arbitrary wireless power receiver in the presence of a nearby representative foreign object (RFO), and
    wherein the minimum Q factor is defined based on a threshold Q factor which is a value of the first Q factor in case that the first Q factor has a same value with the second Q factor.

3. The method of claim 2, wherein the representative foreign object is a representative foreign object which maximizes the threshold Q factor among various types of representative foreign objects.

4. The method of claim 1, wherein, when ΔQ factor=second Q factor−first Q factor, a minimum reference Q factor is defined based on the first Q factor which satisfies ΔQ factor=0; the first Q factor is a Q factor of a reference wireless power transmitter with respect to the arbitrary wireless power receiver in the absence of a nearby foreign object; and the second Q factor is a Q factor of the reference wireless power transmitter with respect to the arbitrary wireless power receiver in the presence of a nearby representative foreign object.

5. The method of claim 1, wherein a minimum reference Q factor is defined as a value compensating the threshold Q factor for a Q factor measurement error.

6. The method of claim 5, wherein the threshold Q factor ranges from 22 to 23, the Q factor measurement error lies within 10% of the threshold Q factor, and the minimum reference Q factor ranges from 24 to 26.

7. The method of claim 6, wherein the threshold Q factor is 22.2.

8. The method of claim 7, wherein the minimum reference Q factor ranges from 24.7 to 25.

9. A method for transferring wireless power to a wireless power receiver by a wireless power transmitter based on foreign object detection in a wireless power transfer system, the method comprising:
    transmitting a digital ping to the wireless power receiver;
    receiving a configuration packet from the wireless power receiver;
    receiving a foreign object detection status packet which informs a reference Q factor ($Q_{ref}$) of the wireless power receiver from the wireless power receiver;
    performing foreign object detection based on the reference Q factor; and
    transferring wireless power to the wireless power receiver based on a result of the foreign object detection,
    wherein the reference Q factor is determined based on five Q factors of a reference wireless power transmitter with respect to the wireless power receiver,
    wherein the five Q factors include a Q factor measured at the center of the reference wireless power transmitter and four Q factors measured at four different positions separated by 5 mm from the center, and
    wherein the reference Q factor is larger than or equal to 25.

10. The method of claim 9, wherein if the first Q factor is denoted as a threshold Q factor ($Q_{ref,OX}$) by which the representative foreign object is detected where a first Q factor ($Q_{RX}$) of a reference wireless power transmitter with respect to the arbitrary wireless power receiver in the absence of a nearby foreign object is the same as a second Q factor ($Q_{RX,RFO}$) of the reference wireless power transmitter with respect to the arbitrary wireless power receiver in the presence of a nearby representative foreign object (RFO), a minimum Q factor value is defined based on the threshold Q factor.

11. The method of claim 9, wherein, when ΔQ factor=second Q factor−first Q factor, a minimum reference Q factor is defined based on the first Q factor which satisfies ΔQ factor=0; the first Q factor is a Q factor of a reference wireless power transmitter with respect to the arbitrary wireless power receiver in the absence of a nearby foreign object; and the second Q factor is a Q factor of the reference wireless power transmitter with respect to the arbitrary wireless power receiver in the presence of a nearby representative foreign object.

12. The method of claim 11, wherein the minimum reference Q factor is defined as a value compensating the threshold Q factor for a Q factor measurement error.

13. The method of claim 12, wherein the threshold Q factor ranges from 22 to 23, the Q factor measurement error lies within 10% of the threshold Q factor, and the minimum reference Q factor ranges from 24 to 26.

14. The method of claim 13, wherein the threshold Q factor is 22.2.

* * * * *